US009860553B2

(12) United States Patent
Bitouk et al.

(10) Patent No.: US 9,860,553 B2
(45) Date of Patent: Jan. 2, 2018

(54) LOCAL CHANGE DETECTION IN VIDEO

(71) Applicant: Intel Corporation, Santa Clara, CA (US)

(72) Inventors: Dmitri Bitouk, Orinda, CA (US); Artem Zinevich, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 362 days.

(21) Appl. No.: 14/661,406

(22) Filed: Mar. 18, 2015

(65) Prior Publication Data

US 2016/0277645 A1 Sep. 22, 2016

(51) Int. Cl.
| | |
|---|---|
| *G06K 9/00* | (2006.01) |
| *H04N 19/527* | (2014.01) |
| *G06K 9/62* | (2006.01) |
| *H04N 5/14* | (2006.01) |
| *H04N 19/139* | (2014.01) |
| *H04N 19/119* | (2014.01) |
| *H04N 19/167* | (2014.01) |
| *H04N 19/54* | (2014.01) |
| *G06T 7/246* | (2017.01) |

(52) U.S. Cl.
CPC ....... *H04N 19/527* (2014.11); *G06K 9/00624* (2013.01); *G06K 9/00765* (2013.01); *G06K 9/6201* (2013.01); *G06K 9/6211* (2013.01); *G06K 9/6218* (2013.01); *G06T 7/246* (2017.01); *H04N 5/144* (2013.01); *H04N 19/119* (2014.11); *H04N 19/139* (2014.11); *H04N 19/167* (2014.11); *H04N 19/54* (2014.11); *G06T 2207/20164* (2013.01)

(58) Field of Classification Search
None
See application file for complete search history.

(56) References Cited

U.S. PATENT DOCUMENTS

| | | | |
|---|---|---|---|
| 8,686,943 | B1 | 4/2014 | Raffii |
| 8,891,868 | B1 | 11/2014 | Ivanchenko |
| 9,063,574 | B1* | 6/2015 | Ivanchenko ............ G06F 3/017 |
| 2002/0118880 | A1 | 8/2002 | Liu et al. |
| 2014/0139454 | A1 | 5/2014 | Mistry et al. |
| 2014/0362240 | A1* | 12/2014 | Klivington ......... H04N 5/23267 |
| | | | 348/208.1 |

FOREIGN PATENT DOCUMENTS

EP          2131329          12/2009

OTHER PUBLICATIONS

Search Report for Taiwan Patent Application No. 105100799, dated Feb. 6, 2017.
International Search Report and Written Opinion for International Patent Application No. PCT/US2016/016543, dated May 24, 2016.

* cited by examiner

*Primary Examiner* — Wesley Tucker
(74) *Attorney, Agent, or Firm* — Green, Howard & Mughal LLP

(57) ABSTRACT

Techniques related to detecting local change in video are discussed. Such techniques may include determining inlier and outlier keypoints for a current frame of a video sequence based on inlier keypoints from previous frames, detecting a region of local change based on outlier keypoints of the current and previous frames, and providing an indicator of local change based on the detected region of local change.

25 Claims, 8 Drawing Sheets

LOCAL CHANGE DETECTION IN VIDEO

BACKGROUND

Devices, such as wearable devices, may be implemented with an always on computer vision interface. Such an always on computer vision interface may provide the device the ability to respond to stimuli visible to the device in a meaningful way such as by fully powering on, illuminating a display, interacting with the stimulus, or the like, even if the device is otherwise idle. For example, an always on computer vision interface may detect a change in a scene such as a hand of a user appearing and respond in a meaningful way to the detected change such as by implementing a device function based on a gesture made by the user, or the like.

However, wearable devices and the like, may create a number of difficulties for computer vision techniques due to their limited power budgets (e.g., such devices are typically expected to operate on battery power for extended periods of time) and the context of their usage. For example, such computer vision interfaces may need to detect, track, and recognize objects that appear in front of a camera of the device with little or no latency to provide a compelling user experience. Furthermore, full execution of computer vision tasks on entire image frames attained via the device may be suboptimal in terms of power efficiency and, in some cases, may be redundant. For example, when a camera of a device is observing a static scene, computer vision tasks may not need to be performed after an initial scene analysis is complete. Any subsequent computer vision tasks should be triggered by a change in the scene, for example. Furthermore, wearable devices and other small devices may move as the wearer's body moves causing the range of motion and amplitude of random jitter and the like to be substantially larger than in other computer vision contexts.

Current techniques for detecting a change in a scene may not resolve such difficulties, particularly for wearable devices. For example, current techniques may include video surveillance techniques that presume a static camera position and use background modeling to detect changes in captured video, optical flow based techniques, phase detection techniques, and block matching techniques. As discussed, wearable device implementations may not provide a static camera position and optical flow based techniques, phase detection techniques, and block matching techniques may handle only limited ranges of global and local motion. Furthermore, such techniques may require the storage of several previous frames in memory, which may not be feasible in the discussed power limited scenarios.

It may be advantageous to provide an always on computer vision interface that is power efficient and applicable in cases of relatively large global motion by the device. It is with respect to these and other considerations that the present improvements have been needed. Such improvements may become critical as the desire to provide high quality images becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
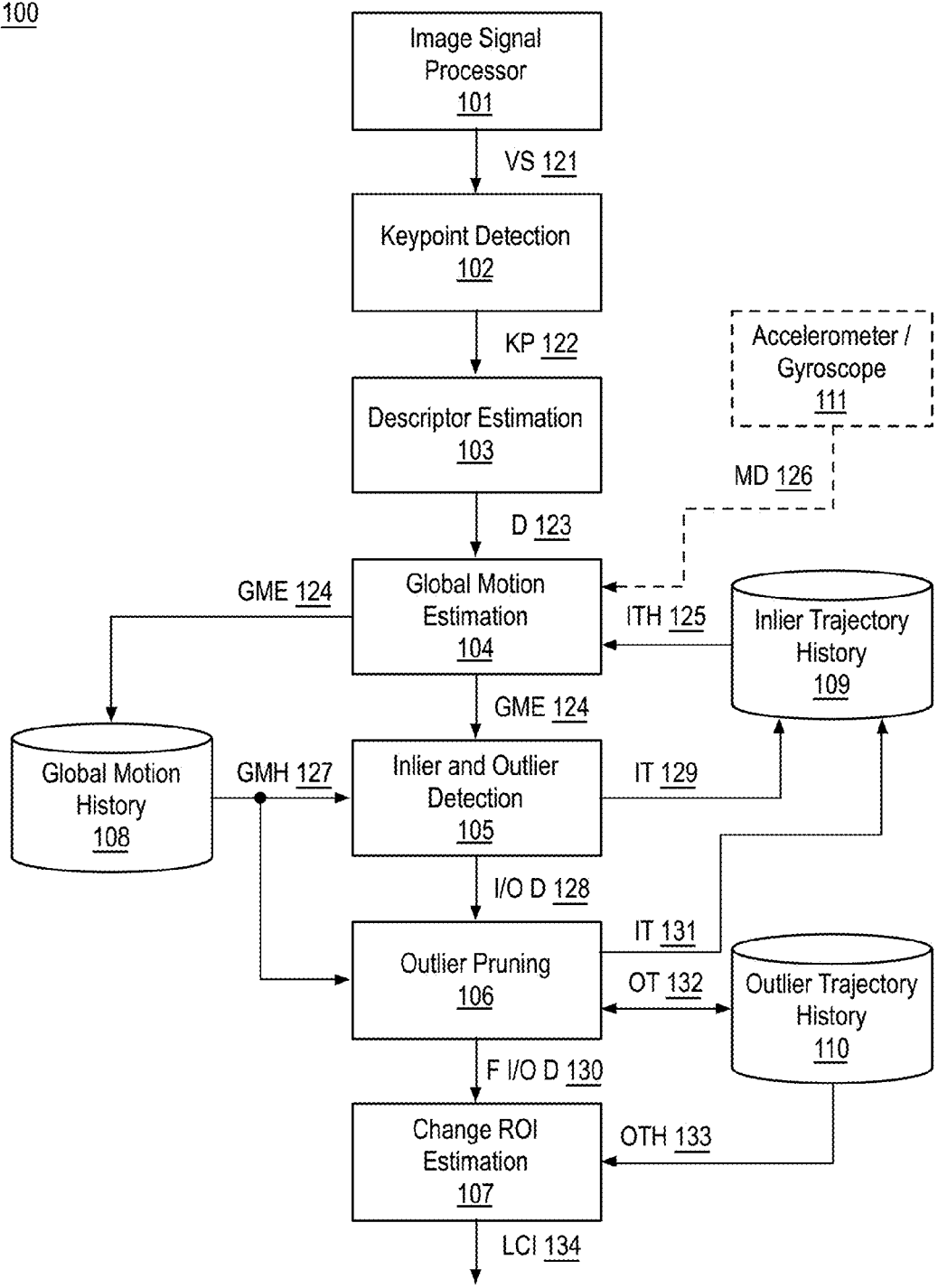
FIG. 1 illustrates an example device for providing local change detection.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to local change detection in a sequence of video and, in particular, to detecting local change based on keypoints associated with frames of the video sequence.

As described above, in always on computer vision interfaces, particularly those implemented in wearable devices, current change detection techniques for scenes of video sequences may not resolve difficulties associated with limited power budgets, the expectancy of very low latency in detection, the use of limited or minimal portions of device memory, the ability to handle large ranges of global motion, and the like. Techniques discussed herein may provide for detecting change such as local change in the context of large global motion between frames of a video sequence. For example, such techniques may be applicable to low frame rate image capture and may provide limited usage of memory and low latency.

For examples, the techniques discussed herein may be based on detection and temporal tracking of image keypoints and associated local image descriptors. By matching descriptors across adjacent image frames using the corresponding descriptors, global affine motion may be estimated and outlier keypoints may be determined. For example, the outlier keypoints may correspond to positions inconsistent with the estimated global motion and clusters of such outlier keypoints may be used to find image regions associated with local changes in the scene captured by the video sequence. The detected image regions may be analyzed using computer vision techniques to, for example, detect novel faces in the scene or to wake up the device based on a hand gesture or the like. Such techniques may therefore be particularly advantageous for uses in always on computer vision interfaces such as those implemented via wearable devices.

In some embodiments, local change detection may be provided by determining or detecting inlier and outlier keypoints in a current frame of a video sequence. For example, such inlier and outlier keypoints may be determined from detected keypoints and associated descriptors based on a matching technique applied to such detected keypoints of the current frame and inlier keypoints of previous frames, as is discussed further herein. For example, inlier keypoints from previous frames may be warped to coordinates of the current frame and matching based on proximity in the spatial domain and the descriptor domain may be performed. In some examples, outlier keypoints of the current and previous frames may pruned (e.g., reassigned as inlier keypoints) as is discussed further herein to generate final outlier keypoints for the current and previous frames.

Based on outlier keypoints of the current frame and outlier keypoints of previous frames, again warped to coordinates of the current frame, a clustering techniques may be applied to detect any regions of local change in the video sequence. For example, such outlier keypoints from the current and previous frames may cluster within a region when local change has occurred. Such clusters may be detected and an associated indicator of local change (e.g., a local motion detected indicator or a bounding box location and size associated with the cluster or the like) may be provided. Such an indicator of local change may be used by the device to wake the device from a low power state, provide a change for the device (e.g., illuminating a display screen, increasing an image capture rate, or the like), perform object recognition, or the like. Such techniques may provide low latency and high quality (e.g., low false positive rate) results using low power, memory, and computational resources.

FIG. 1 illustrates an example device 100 for providing local change detection, arranged in accordance with at least some implementations of the present disclosure. As shown in FIG. 1, device 100 may include an image signal processor 101, a keypoint detection module 102, a descriptor estimation module 103, a global motion estimation module 104, an inlier and outlier detection module 105, an outlier pruning module 106, and a change region of interest (ROI) estimation module 107. Furthermore, device 100 may include memory (not labeled) that may provide for storage of and access to data associated with local change detection. For example, the memory of device 100 may store and provide access to global motion history 108, inlier trajectory history 109, outlier trajectory history 110, and the like. Furthermore, device 100 may include an accelerometer/gyroscope module 111 that may provide motion data 126 for use by global motion estimation module 104 in estimating global motion between frames as is discussed further herein. Device 100 may be any suitable form factor device such as a wearable device. For example, device 100 may be a smart watch, smart glasses, a wearable accessory, clothing, or the like. However, although discussed herein with respect to a wearable device, device 100 may include any form factor device including a computer, a laptop computer, a tablet, a smart phone, a digital camera, a display device, or the like. For example, device 100 may provide local change detection as discussed herein.

As shown, keypoint detection module 102 may receive a video sequence (VS) 121 from image signal processor 101. For example, image signal processor 101 may receive image sensor data from an image sensor (not shown) of device 100. Such an image sensor and image signal processor 101 may be operating in a passive mode, low power mode, ultra-low power mode, or the like to save power usage by device 100. For example, the image sensor and image signal processor 101 may provide video sequence 121 having low resolution and a low frame rate to save power in a passive always on computer vision interface mode for device 100. Video sequence 121 may include any suitable image frame data at any suitable resolution and frame rate.

Figure 2:
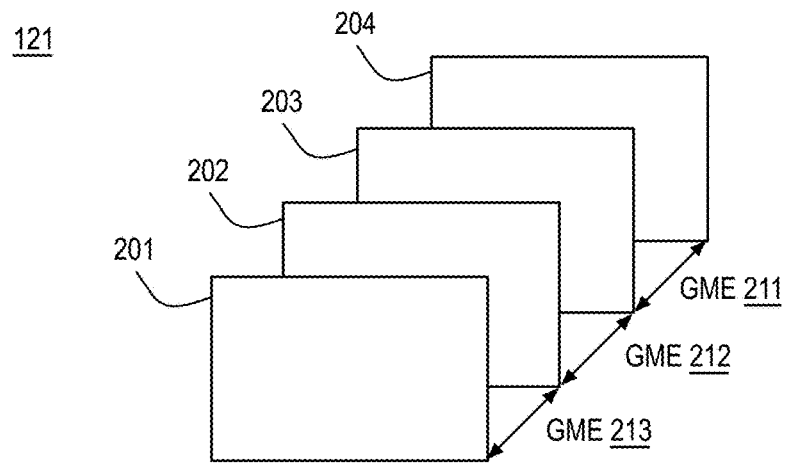
FIG. 2 illustrates an example video sequence including a current frame and multiple previous frames.

FIG. 2 illustrates an example video sequence 121 including a current frame 201 and multiple previous frames 202-204, arranged in accordance with at least some implementations of the present disclosure. As shown, video sequence 121 may include current frame 201 and any number of previous frames 202-204. For example, three previous frames 202-204 are illustrated with respect to video sequence 121 and discussed in association with local change detection, however, video sequence 121 and such local change detection techniques may involve any number of previous frames. As discussed, video sequence 121 may, in some examples, include low resolution frames 201-204 at a relatively low frame rate. For example, frames 201-204 may be at any resolution less than a full resolution of an image sensor and at any frame rate less than a full frame rate capability of the image sensor to provide low power processing for device 100. In some examples, frames 201-204 may have a frame rate of about 5 frames per second (fps) or not more than 5 fps or the like. In some examples, frames 201-204 may have a frame rate between about 1 fps and 5 fps. A frame rate of less than 1 fps may, in some examples, provide inaccurate local change detection, however any suitable frame rate may be used. Furthermore, the frame rate of video sequence 121 may be constant in some examples and may vary in other examples. For example, device 100 may vary the frame rate of video sequence 121 based on global motion estimation (discussed further below; e.g., such that greater detected motion may be associated with a higher frame rate and lower detected motion may be associated with a lower frame rate), user settings, other device settings such as power management settings, or the like. As discussed, frames 201-204 may include any suitable image data.

Also as shown in FIG. 2, global motion estimation may be performed between or across frames 201-204 to provide global motion estimation 211 between frame 204 and frame 203, global motion estimation 212 between frame 203 and frame 202, and global motion estimation 213 between frame 202 and frame 201, and so on. Such global motion estimation may be performed on a frame by frame basis as shown in FIG. 2 or across multiple frames (e.g., global estimation between some frames may be skipped). Such global motion estimation 211-213 may include any suitable data indicating global change between or across frames. For example, global motion estimation 211-213 may include motion parameters such as translation, scale, rotation, skew, or the like. For example, such global motion estimation 211-213 may include parameters to define global motion between whole frames (e.g., frames 201-204). In some examples, such global motion estimation data may be provided by global estimation module 104 as is discussed further herein.

Returning to FIG. 1, keypoint detection module 102 may receive video sequence 121 on an ongoing basis from image signal processor 101, and keypoint detection module 102 may generate keypoints (KP) 122 based on video sequence 121. For example, keypoints 122 may be generated for a current frame of video sequence 121. Keypoint detection module 102 may generate keypoints 122 using any suitable technique or techniques. For example, keypoint detection module 102 may detect points of interest within frames 201-204 of video sequence 121. For example, keypoint detection module 102 may implement edge detection, corner detection, blob detection, or the like to generate keypoints 122. In some examples, keypoint detection module 102 may implement an accelerated segment test (AST) to generate keypoints 122. Such an accelerated segment test may include corner detection via implementing a pixel brightness comparison within a neighborhood of a subject pixel to determine whether the subject pixel is a keypoint, for example. Such accelerated segment tests may provide robust keypoint detection. Keypoints 122 may include any suitable data associated with such keypoints and keypoints detection such as the location within an image frame of such keypoints.

Figure 3:
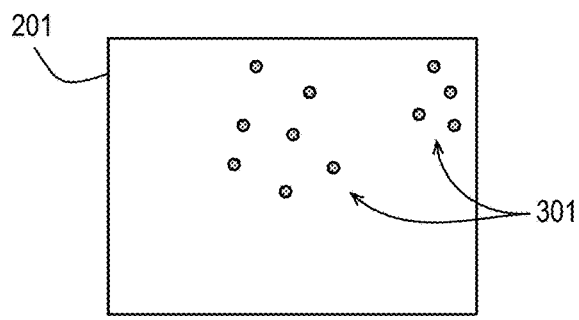
FIG. 3 illustrates example keypoints of an example current frame.

FIG. 3 illustrates example keypoints 301 of example current frame 201, arranged in accordance with at least some implementations of the present disclosure. As shown in FIG. 3, keypoints 301 may be determined throughout frame 201. Furthermore, keypoints 301 may be identified via locations within frame 201. Although illustrated with about 12 keypoints 301 in FIG. 3 and elsewhere herein for the sake of clarity of presentation, frame 201 may include any number of keypoints 301 such as hundreds (e.g., a few hundred) or thousands of keypoints 301.

Returning to FIG. 1, as shown, keypoint detection module 102 may provide keypoints 122 to descriptor estimation module 103 and/or a memory (not shown) of device 100. Descriptor estimation module 103 may receive keypoints 122 from keypoint detection module 102 or memory and descriptor estimation module 103 may generate descriptors (D) 123 associated with keypoints 122. For example, descriptors 123 may include a descriptor for each of keypoints 122. Descriptor estimation module 103 may generate descriptors 123 using any suitable technique or techniques. Furthermore, such descriptors 123 may include any suitable descriptors or descriptor families such as image descriptors or the like. For example, descriptors 123 may be associated with, for keypoints 122, pixel color, brightness, gradients, expansiveness, luminance, intensity, evaluation of pixel blocks, or the like. For example, descriptor estimation module 103 may implement a lower power cost descriptor estimation technique to save power for device 100. In some examples, a single descriptor may be implemented for each of keypoints 122. In other examples, two, three, or more descriptors may be implemented for each of keypoints 122. As is discussed further herein, such descriptors may be used to find local correspondence between keypoints of adjacent frames. As shown, descriptor estimation module 103 may provide descriptors 123 to global estimation module 104 and/or a memory of device 100.

Global motion estimation module 104 may receive descriptors 123, keypoints 122, inlier trajectory histories 125, as well as optional motion data 126 from accelerometer/gyroscope module 111 and global motion estimation module 104 may generate global motion estimation 124. Global motion estimation module 104 may generate global motion estimation 124 using any suitable technique or techniques. For example, as discussed, keypoints 122 and descriptors 123 may be used to find or determine correspondence between keypoints 122 of the current frame and any number of previous frames. Global motion estimation module 104 may use such correspondence between keypoints to estimate an affine transformation between the current frame and any number of previous frames. For example, global estimation module 104 may use inlier trajectory histories 125 to estimate or extrapolate global motion for a current frame based on past correspondences or mappings between inlier keypoints. For example, global motion estimation module 104 may determine such an affine transformation based on robust regression techniques or the like. Such affine transformation estimation may include or may be used to determine global motion between frames as discussed herein (please refer to FIG. 2). For example, global motion between or across frames may include motion parameters such as translation, scale, rotation, skew, or the like. Also, as shown, global motion estimation module 104 may include or integrate motion data 126 from accelerometer/gyroscope module 111 to generate such global motion parameters. Such motion data 126 may include any suitable data indicative of the motion of device 100 over time. In some examples, global motion estimation module 104 may integrate motion data 126 to improve the accuracy and/or robustness of global motion estimation 124.

As discussed, global motion estimation module 104 may generate global motion estimation 124 (e.g., parameters indicating global motion between or across frames). Also, as is discussed further herein, inlier keypoint trajectories and outlier keypoint trajectories may be generated (e.g., via inlier and outlier detection module 105 and/or outlier pruning module 106 and as stored via inlier trajectory history 109 and outlier trajectory history 110). Such global motion estimation and inlier trajectories (and, in some cases outlier trajectories) may be used via device 100 to perform other tasks such as estimation of a 3-dimensional (3D) scene based on inlier trajectories from several adjacent frames, digital video stabilization using smoothed global motion estimation, or the like. For example, such digital video stabilization may be particularly well suited for stabilizing low frame rate video in wearable device implementations of device 100 since it may handle a wide range of motion by device 100. As shown, global motion estimation module 104 may provide global motion estimation 124 to inlier and outlier detection module 105 and global motion history 108. For example, global motion history 108 may maintain a history of global motion estimates between any number, N, of the most recent frames of video sequence 121. For example, the number of most recent frames, N, used for processing as discussed herein may be two, three, four, or more previous frames.

Inlier and outlier detection module 105 may receive global motion estimation 124, global motion histories 127 (e.g., global motion estimates or estimations for previous frames), keypoints 122, and descriptors 123, and inlier and outlier detection module 105 may determine inliers and/or outliers from among keypoints 122 and may generate inlier/outlier data (I/O D) 128. Inlier and outlier detection module 105 may generate inlier/outlier data 128 using any suitable technique or techniques. For example, inlier and outlier detection module 105 may determine inlier keypoints and outlier keypoints of a current frame (e.g., frame 201) based on inlier keypoints in one or more previous frames (e.g., frames 202-204 or the like). For example, inlier and outlier detection module 105 may access (e.g., via a memory of device 100) inlier and outlier keypoints for any number, N, of the most recent frames of video sequence 121 to generate inlier/outlier data 128 indicating which of keypoints 122 are inlier keypoints and which are outlier keypoints.

For example, inlier keypoints of keypoints 122 may be those keypoints that are consistent with the global motion between several most recent image frames. Those keypoints that are inconsistent with global motion between several most recent image frames may be outlier keypoints and may be associated with local motion or local changes in the scene associated with video sequence 121, for example. Such outlier keypoints may be further tested at outlier pruning module 106 as is discussed further herein.

As discussed, inlier and outlier detection module 105 may determine inlier keypoints and/or outlier keypoints from among keypoints 122 using any suitable technique or techniques. In some examples, inlier and outlier detection module 105 may use global motion estimation data from global motion history 108 (e.g., global motion histories 127) to warp inlier keypoints from any number (e.g., N) most recent frames to the coordinate system of the current frame. For example, with reference to FIG. 2, inlier keypoints associated with frame 202 may be warped to the coordinate system of frame 201 based on global motion estimation 213, inlier keypoints associated with frame 203 may be warped to the coordinate system of frame 201 based on global motion estimation 212 and global motion estimation 213, and so on.

For example, first, for each keypoint of the current frame (e.g., frame 201), inlier keypoints in any previous frame (e.g., a previous frame k such that k≤N) such as previous frames 202-204 or the like, within a spatial neighborhood of the current or subject keypoint (e.g., in the coordinates of the current frame) are determined. For example, all warped inlier keypoints from previous frames that are at most R pixels away or the like may be determined.

Figure 4:
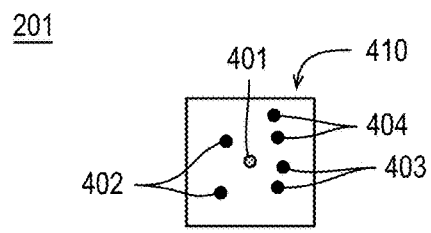
FIG. 4 illustrates example previous frame inlier keypoints within a spatial neighborhood of a keypoint of the current frame.

FIG. 4 illustrates example previous frame inlier keypoints 402-404 within a spatial neighborhood 410 of a keypoint 401 of a current frame 201, arranged in accordance with at least some implementations of the present disclosure. As shown in FIG. 4, for a subject keypoint 401 of current frame 201, spatial neighborhood 410 may be provided. Spatial neighborhood 410 may be any suitable size or shape. In the illustrated example, spatial neighborhood 410 is substantially square, however any neighborhood shape such as circular, rectangular, or the like may be used. Furthermore, spatial neighborhood 410 may define a neighborhood such that previous frame inlier keypoints 402-404 within a pixel distance, R, are provided for descriptor distance evaluation as is discussed herein. The pixel distance may be any suitable pixel distance such as 10 pixels, 20 pixels, 50 pixels, or the like.

Also as shown, previous frame inlier keypoints 402-404 may be within spatial neighborhood 410 (e.g., after being warped to the coordinates of current frame 201). In the illustrated example, previous frame inlier keypoints 402 may be associated with previous frame 202, previous frame inlier keypoints 403 may be associated with previous frame 203, and previous frame inlier keypoints 404 may be associated with previous frame 204, for example. Although illustrated with two each of previous frame inlier keypoints 402,403,404, any number of previous frame keypoints may be within spatial neighborhood 410. As is discussed further herein, inlier and outlier detection module 105 may determine such previous frame inlier keypoints 402-404 based on spatial neighborhood 410 and such previous frame inlier keypoints 402-404 may be further evaluated based on a comparison of their associated descriptors to the descriptor associated with keypoint 401 of current frame 201.

For example, returning to FIG. 1, based on such described previous frame inlier keypoints, a smallest descriptor distance for the previous frame inlier keypoints may be determined for each previous frame. For example, the smallest descriptor distance may be associated with the previous frame keypoint that has the descriptor or descriptors with smallest difference with respect to the descriptor or descriptors of the current or subject keypoint of the current frame (e.g., keypoint 401). The smallest descriptor distance may be compared to a threshold and, if the smallest descriptor distance is less than the threshold, a match between the current keypoint from the current frame and the smallest descriptor distance keypoint from the previous frame may be determined or declared. Such a process may be repeated for all participating previous frames (e.g., for N frames) to generate one or more matches (e.g., one potential match for each previous frame) for the current or subject keypoint of the current frame. For example, for a current frame keypoint, there may or may not be a match in the most recent previous frame, in the next most recent previous frame, and so on.

Based on the one or more matches across the previous frames, a matching score may be generated for the current or subject keypoint of the current frame. The matching score may be generated using any suitable technique or techniques. For example, the matching score may be a sum across the participating previous frames of products of either 1 for a match or 0 for no match and an importance weight. For example, the importance weight may weigh matches in more recent past frames more highly than matches to more distance past frames. For example, the matching score may be generated as shown with respect to Equation (1):

$$S_i^{(in)} = \sum_{k=1}^{N} M_{i,t-k} w_k \qquad (1)$$

where S may be the inlier matching score (e.g., the (in) indicating inlier), i may be a counter variable for each keypoint in the current frame, t may be an indicator of the current frame, k may be counter variable for previous frames, N may be the number of previous frames used in the determination (e.g., such that an inlier matching score, S, may be generated for each keypoint, of the current frame, t, based on each previous frame, k, of N previous frames), M may be a 1 if there is a match between keypoint, i, and a keypoint in frame t-k, and w may be an importance weight. As discussed, importance weights may be greater for more recent past frames such that $w_1 > w_2 > w_3 > \ldots > w_N$.

As discussed, if the inlier matching score for a keypoint, i, is greater than a threshold, the keypoint, i, may be labeled as an inlier and, otherwise, the keypoint, i, may be labeled as an outlier. For example, the threshold may be characterized as a matching threshold and the matching threshold may be any suitable value with a lower value providing more inlier keypoints (and potential false positives) and a higher value providing fewer inlier keypoints (and potential false negatives). As shown in FIG. 1, if the keypoint, i, is labeled an inlier, an inlier trajectory associated with the keypoint may be generated (e.g., based on the trajectory traversed by the matched keypoints) and provided to inlier trajectory history 109 as part of inlier trajectories (IT) 129. Furthermore, such an inlier/outlier keypoint determination may be made for all keypoints of the current frame and the resultant trajectories may be provided as inlier trajectories 129 to inlier trajectory history 109 for those keypoints classified as inlier keypoints. Furthermore, such inlier/outlier keypoint determinations may be used to generate inlier/outlier data 128, which may associated a pertinent inlier or outlier label with each keypoint of keypoints 122. Such inlier/outlier data 128 may be provided to a memory of device 100 and/or outlier pruning module 106. Inlier/outlier data 128 may include any suitable data such as a binary indicator associated with each keypoint of keypoints 122 or the like.

As discussed, inlier/outlier data 128 may be generated based on determining matches (if any) for a keypoint of a current frame with inlier keypoints of previous frames. Such a match may be determined based on a spatial distance (e.g., a previous frame inlier keypoint match must be within a spatial neighborhood, such as spatial neighborhood 410, of the keypoint) and a descriptor distance (e.g., a previous frame inlier keypoint match must have a descriptor difference that is less than a threshold). Furthermore, inlier/outlier data 128 may be generated based on a comparison of a matching score for each keypoint to a matching score threshold. Such inlier/outlier data 128 may indicate inlier keypoints and outlier keypoints among keypoints 122. In some examples, outlier keypoints determined using such techniques may be further evaluated to determine if one or more such outliers, along with outliers from past frames generate a chain of matches. If so, such previously determined outlier keypoints may be changed to inlier keypoints. Furthermore, matching outlier keypoints from previous frames may also be changed to inlier keypoints (e.g., the entire chain of matches may be reassigned to inlier keypoints).

For example, outlier pruning module 106 may determine if any outlier keypoints among inlier/outlier data 128 are to be relabeled as inlier keypoints. Outlier pruning module 106 may make such a determination using any suitable technique or techniques. In some examples, outlier pruning module 106 may detect inlier keypoints from previously labeled outlier keypoints by detecting matches for the outlier keypoint with outlier keypoints from the previous frames. In some examples, if an outlier has a match in a majority of such previous frames, the outlier and the matches (e.g., previously labeled outliers from previous frames) may be labeled as inliers. For example, if an outlier keypoint from the current frame is found to match (e.g., based on spatial and/or descriptor distances as discussed herein) an outlier keypoint from a majority of previous frames, the outlier keypoint and the outlier keypoint matches may be declared as inlier keypoints. Furthermore, outlier pruning module 106 may determine inlier trajectories (IT) 131 for such newly labeled inliers and outlier trajectories (OT) 132 for those outliers that remain outliers and provide such trajectories to inlier trajectory history 109 and outlier trajectory history 110, respectively.

As discussed, outlier pruning module 106 may determine if any outlier keypoints among inlier/outlier data 128 are to be relabeled as inlier keypoints using any technique or techniques. In some examples, outlier keypoints in the current frame may be matched against outlier keypoints in the most recent N frames. If one of the outlier keypoints in the current frame has matches among outlier keypoints in the majority of recent frames, the outlier keypoint in the current frame and the matches (e.g., the matching outlier keypoints from the previous frames) may be removed from outlier trajectory history 110 and moved or appended to inlier trajectory history 109 (e.g., via inlier trajectory 131). In other examples, an outlier matching score may be generated and compared to a threshold to determine whether the outlier keypoints are to be relabeled. For example, for each outlier keypoint (e.g., among inlier/outlier data 128), $i_t$, in the current frame, a chain of matches (e.g., matching outlier keypoints from previous frames), $i_t, i_{t-1}, \ldots, i_{t-N}$, may be determined in the previous frames such that $i_{t-k}=0$ if no match is found in frame t-k. Such matches or chains of matches may be based on spatial proximity and descriptor value proximity as discussed herein. In some examples, a majority test may be applied such that if matches are found in a majority of previous frames, the matched outlier keypoints are relabeled as inlier keypoints.

In other examples, an outlier matching score may be determined for each outlier keypoint in the current frame based on such matches (if any). The outlier matching score may be generated using any suitable technique or techniques. For example, the outlier matching score may be a sum across the participating previous frames of products of either 1 for a match or 0 for no match and an importance weight. For example, the importance weight may weigh matches in more recent past frames more highly than matches to more distance past frames. In some examples, the outlier matching score may be generated as shown with respect to Equation (2):

$$S_i^{(out)} = \sum_{k=1}^{N} M_{i,t-k} w_k^{(out)} \quad (2)$$

where S may be the outlier matching score (e.g., the (out) indicating outlier), i may be a counter variable for each outlier keypoint, t may be an indicator of the current frame, k may be counter variable for previous frames, N may be the number of previous frames used in the determination (e.g., such that an outlier matching score, S, may be generated for each outlier keypoint, i, of the current frame, t, based on each previous frame, k, of N previous frames), M may be a 1 if there is a match between outlier keypoint, i, and an outlier keypoint in frame t-k, and w may be an importance weight. As discussed, importance weights may be greater for more recent past frames such that $w_1 > w_2 > w_3 > \ldots > w_N$.

As discussed, if the outlier matching score for an outlier keypoint, i, is greater than a threshold, the outlier keypoint, i, may be labeled as an inlier keypoint along with the matching keypoints from previous frames (e.g., the entire chain of matching keypoints may be relabeled as inlier keypoints) and, otherwise, the outlier keypoint, i, may remain an outlier. As shown in FIG. 1, if the outlier keypoint, i, is labeled (e.g., re-labeled) an inlier keypoint, an inlier trajectory associated with keypoint, i, may be generated (e.g., based on the trajectory traversed by the matched keypoints) and provided to inlier trajectory history 109 as part of inlier trajectories (IT) 131. If the outlier keypoint is not labeled an inlier keypoint (e.g., it remains an outlier keypoint), an outlier trajectory associated with keypoint, i, may be generated and provided to outlier trajectory history 110 as part of outlier trajectories (IT) 132. Furthermore, such an outlier pruning determination may be made for all previously outlier labeled keypoints of the current frame and the resultant trajectories may be provided as inlier trajectories 131 to inlier trajectory history 109 or outlier trajectories 132 to outlier trajectory history 110, respectively. Furthermore, final inlier/outlier data 130 may be generated based on such outlier keypoints pruning. Such final inlier/outlier data (F I/O D) 130 may be provided to a memory of device 100 and/or change region of interest estimation module 107. Such final inlier/outlier data 130 may include any suitable data such as a binary indicator associated with each keypoint of keypoints 122 or the like.

As discussed, inlier keypoints and outlier keypoints of a current frame may be determined with respect to one or more previous frames. Such current frame inlier keypoints may be mapped to inlier keypoints of previous frames by inlier and outlier detection module 105 and/or to outlier keypoints via outlier pruning module 106. Such modules may be implemented separately as shown in FIG. 1 or together as an inlier detection module or inlier and outlier detection module or the like.

Figure 5:
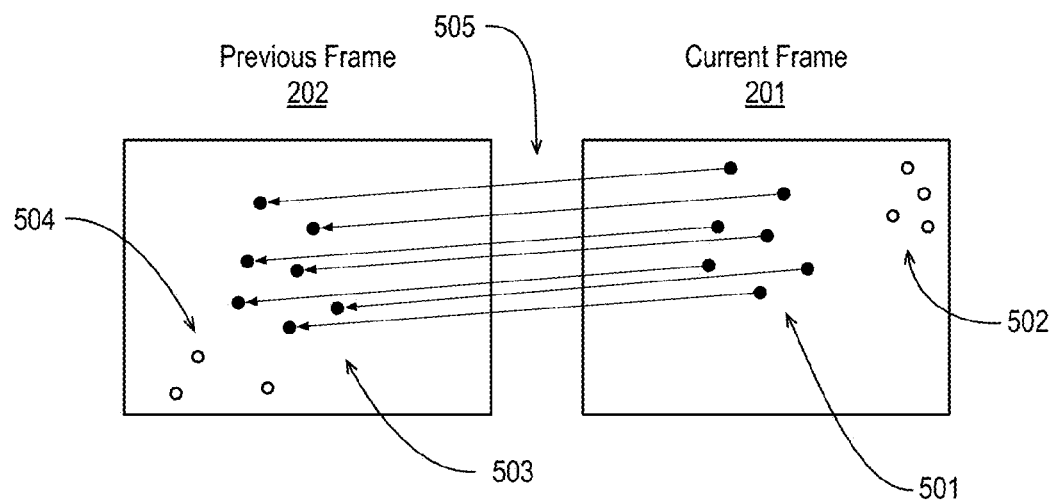
FIG. 5 illustrates example inlier keypoint matching between a current frame and a previous frame.

FIG. 5 illustrates example inlier keypoint matching between current frame 201 and previous frame 202, arranged in accordance with at least some implementations of the present disclosure. As shown in FIG. 5, current frame 201 may include inlier keypoints 501 and outlier keypoints 502 determined using any techniques such as those discussed herein. Furthermore, previous frame 202 may include inlier keypoints 503 and outlier keypoints 504 determined using any techniques such as those discussed herein. As shown, inlier keypoints 501 of current frame 201 and inlier keypoints 503 of previous frame 202 may have a mapping 505 therebetween such that associated inlier keypoints 501 and inlier keypoints 503 (as indicated by arrows) are matches. As discussed, any number, N, of previous frames may be evaluated as discussed herein and mappings analogous to mapping 505 may be made between the current frame and any number of previous frames and/or between such previous frames. Also as discussed, such mappings may provide or may be used to provide inlier trajectories for inlier keypoints 501.

Returning to FIG. 1, change region of interest estimation module 107 may receive final inlier/outlier data 130 or at least final outlier data of final inlier/outlier data 130 and outlier trajectory history 133, and change region of interest estimation module 107 may monitor such data and, if applicable, generate local change indicator 134 when a local change detection has occurred. Change region of interest estimation module 107 may detect such local changes using any suitable technique or techniques. For example, detecting the region of local change may include warping outlier keypoints from previous frames to a coordinate system of the current frame and applying a clustering technique to the outlier keypoints of the current and previous frames. For example, a region of local change may be detected when at least some of such outlier keypoints indicate a cluster. Such a cluster may indicate an image region where local motion has occurred or a local change not compatible with global motion has occurred.

For example, change region of interest estimation module 107 may warp outlier keypoints from any number, N, of previous frames (e.g., as determined via outlier trajectory history 133) to a coordinate system of the current frame based on global motion estimations such as global motion estimation 124. Each such warped outlier keypoint may be assigned an importance weight value such that a higher weight is given to outlier keypoints from more recent frames and a highest weight is given to outlier keypoints from the current frame, for example. Based on such outlier keypoints warped to the coordinates of the current frame and their associated importance weights, change region of interest estimation module 107 may apply a clustering technique such as a weighted k-means clustering technique or the like. Such clusters, if detected, may be used to generate local change indicator 134. Local change indicator 134 may be any suitable indicator of local change such as a local motion detected signal or indicator (e.g., a binary signal), an indicator of a center of the cluster, an indicator of a bounding box location and size data to indicate a bounding box around the detected cluster, or the like.

Figure 6:
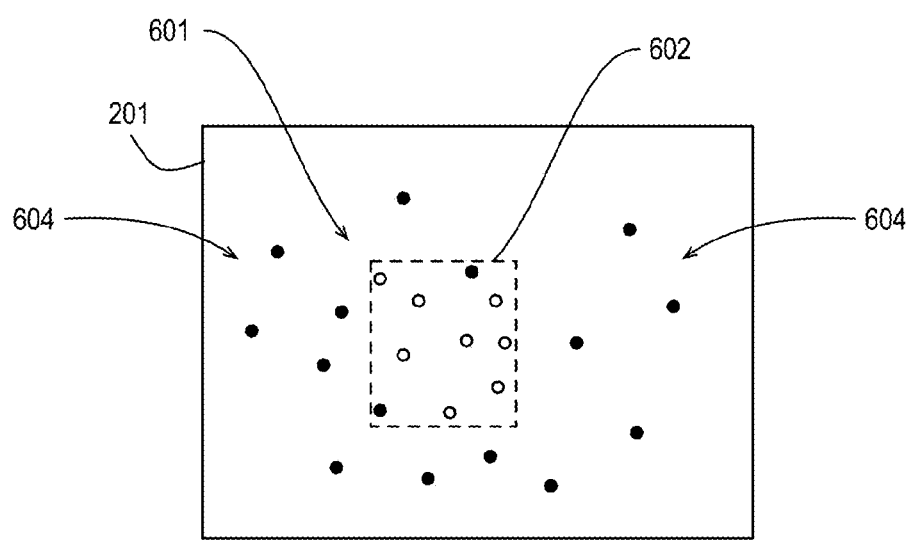
FIG. 6 illustrates an example cluster of outlier keypoints indicating a region of local change.

FIG. 6 illustrates an example cluster of outlier keypoints 601 indicating a region of local change, arranged in accordance with at least some implementations of the present disclosure. For example, as shown in FIG. 6, current frame 201 may include inlier keypoints 604 (e.g., indicated via solid circles) and cluster of outlier keypoints 601 (e.g., indicated via open circles). As discussed, cluster of outlier keypoints 601 may be detected via change region of interest estimation module 107 and local change indicator 134 may be generated based on cluster of outlier keypoints 601. Furthermore, in some examples, local change indicator 134 may include or be associated with bounding box location and size data to indicate a bounding box associated with cluster of outlier keypoints 601. For example, local change indicator 134 may indicate a bounding box 602 associated with cluster of outlier keypoints 601. For example, local change indicator 134 may indicate a location (e.g., a top-left corner) of bounding box 602 and a size (e.g. a height and width) of bounding box 602.

Returning to FIG. 1, device 100 may use local change indicator 134 for any suitable purpose. For example, device 100 may, in response to local change indicator 134, awake from a sleep or idle state (e.g., perform a wake up from a low power state based on an indicator of local change via a power management unit, not shown), illuminate a display device (not shown), increase a frame capture rate, increase a frame capture resolution, perform object recognition or tracking (e.g., based on a bounding box indicated via local change indicator 134), or the like. In some examples, such object recognition or tracking may include recognizing a gesture made by a user to prompt an action by device 100.

As discussed, device 100 may provide or perform robust local change detection in video. The techniques discussed herein may reduce false positive rates as compared to previous light sensing mode (LSM) techniques, improve response times particularly for gesture control interfaces, provide bounding boxes for image regions having local change to computer vision modules, and/or estimate global motion between or across frames for use in video stabilization or the like. Furthermore, such techniques may be applicable when device 100 experiences a wide range of motion and may save memory space, computational resources, and power as there is no need store full previous frames (e.g., only local keypoints, descriptors, and trajectories may be stored) or perform full frame processing. Such characteristics may make implementation of the discussed techniques advantageous in small form factor devices, such as wearable devices, implementing an always on computer vision interface.

Figure 7:
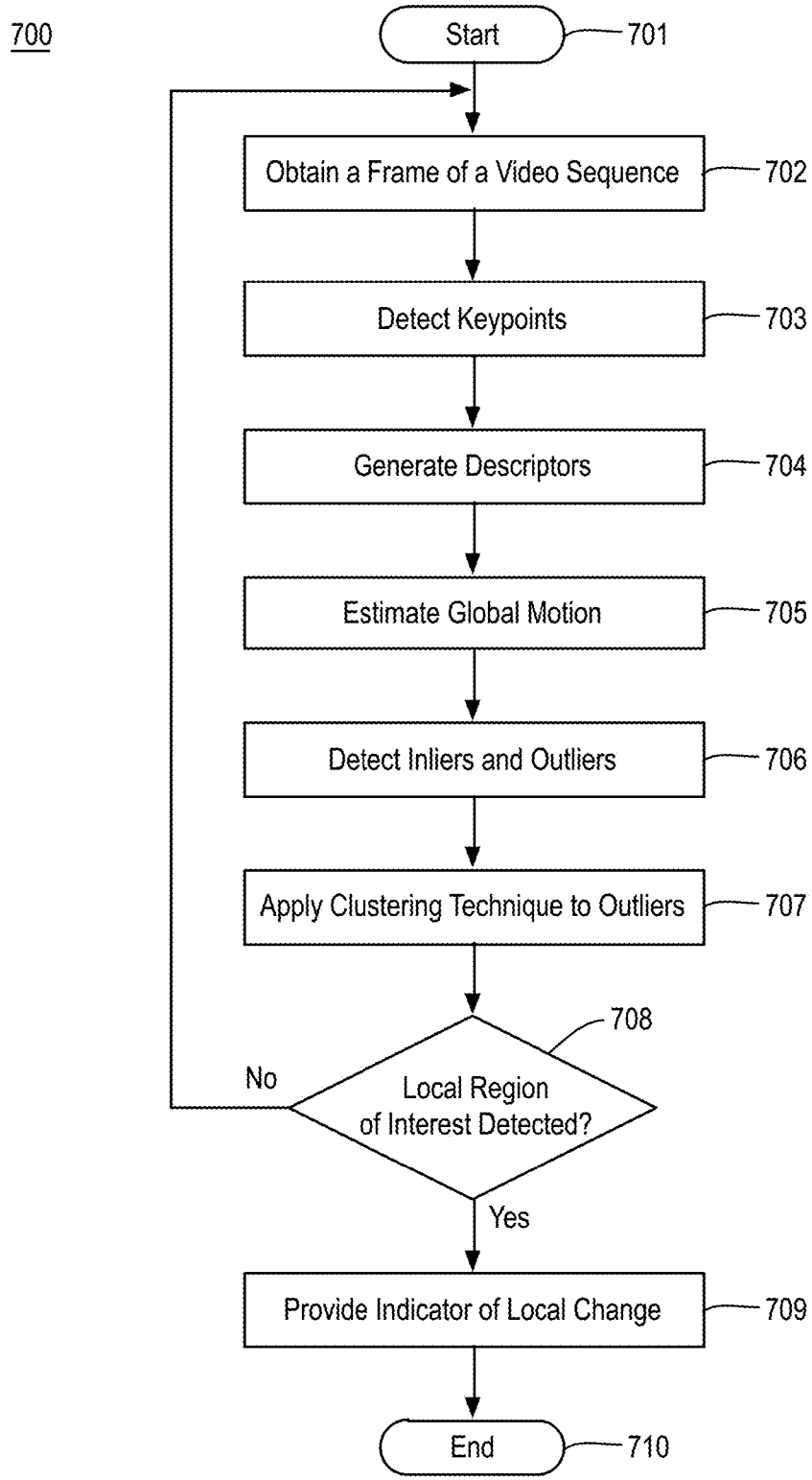
FIG. 7 is a flow diagram illustrating an example process for providing local change detection in video.

FIG. 7 illustrates an example process 700 for providing local change detection in video, arranged in accordance with at least some implementations of the present disclosure. Process 700 may include one or more operations 701-710 as illustrated in FIG. 7. Process 700 may be performed by a device (e.g., device 100 or any other devices or systems discussed herein) or portions of process 700 may be performed by a device to provide local change detection in video. Process 700 or portions thereof may be repeated for any number image frames, video sequences, portions thereof, or the like.

As shown, process 700 may begin from start operation 701 at operation 702, "Obtain a Frame of a Video Sequence", where a frame of a video sequence may be obtained. For example, a current frame of a video sequence may be obtained from an image signal processor, an image sensor, an image processing pipeline, or the like. For example, current frame 201 of video sequence 121 may be obtained. In some examples, previous frames (e.g., previous frames 202-204) may have been previously processed via process 700 such that inlier keypoints and outlier keypoints of previous frames and their respective trajectories have been previously determined. As discussed, the current frame may be any suitable current frame such as a low resolution and low frame rate frame of a video sequence.

Processing may continue at operation 703, "Detect Keypoints", where keypoints may be detected for the current frame. As discussed, keypoints may be detected for the current frame using any suitable technique or techniques such as an accelerated segment test (AST) technique or the like. For example, the current frame may have hundreds of keypoints determined via operation 703.

Processing may continue at operation 704, "Generate Descriptors", where descriptors may be generated for the keypoints determined at operation 703. Such descriptors may be determined using any suitable technique or techniques and any number of descriptors, such as one, two, three, or more, descriptors may be used. For example, one or more descriptors may be generated for each keypoint of the current frame. As discussed, such descriptors may include any suitable descriptors, descriptor families, or combination thereof such as pixel color, brightness, gradients, expansiveness, luminance, intensity, evaluation of pixel blocks, or the like.

Processing may continue at operation 705, "Estimate Global Motion", where global motion may be estimated for the current frame. Such global motion may be determined using any suitable technique or techniques such as determining a correspondence between keypoints in the current frame to keypoints in the previous frame(s) and/or correspondence between keypoints in the previous frames and estimating an affine transformation between the current frame and any number of previous frames based on robust regression techniques or the like. Such global motion estimates may include any global motion parameters such as translation, scale, rotation, skew, or the like. Furthermore, as discussed with respect to accelerometer/gyroscope module 111, such global motion estimation may include the evaluation of motion data generated by accelerometer/gyroscope module 111. In some examples, global motion estimates made at operation 705 may be used by other device components for video stabilization techniques or the like.

Processing may continue at operation 706, "Detect Inliers and Outliers", where inlier keypoints and outlier keypoints may be determined for the current frame. Such inlier keypoints and outlier keypoints may be determined using any suitable technique or techniques such as those discussed herein with respect to FIG. 8 or elsewhere herein. For example, such inlier keypoints and outlier keypoints for the current frame may be determined based on inlier keypoints of one or more previous frames of the video sequence. For example, each keypoint of the current frame may be evaluated to determine matches, if any, with inlier keypoints in previous frames. Such matches may be based on the spatial proximity (e.g., warped to the current frame) of the keypoints of the previous frames and descriptor value proximity of the keypoints of the previous frames. A matching score may be determined for each keypoint of the current frame based on whether or not a previous frame had a match and an importance weight for the previous frame. Based on the matching score (e.g., based on a comparison of the matching score to a threshold), each keypoint may be classified as an inlier or outlier keypoint. In some examples, such outlier keypoints may be pruned as discussed further herein. Furthermore, trajectories associated with such inlier and outlier keypoints may be determined for further processing.

Processing may continue at operation 707, "Apply Clustering Technique to Outliers", where a clustering technique or the like may be applied to the outliers of the current frame and warped outliers from previous frames. Such a clustering technique may include any suitable clustering technique or techniques such as a weighted k-means clustering technique, connectivity based clustering, centroid based clustering, distribution based clustering, density based clustering, or the like. For example, such clustering techniques may attempt to detect a cluster of outlier keypoints indicative of a local region of interest within the current frame.

Processing may continue at decision operation 708, "Local Region of Interest Detected?", where a determination may be made as to whether a local region of interest has been detected via the clustering technique applied at operation 707. For example, a local region of interest may be detected if a cluster is identified or detected at operation 707. If no region of interest is detected at decision operation 708, process 700 may continue at operation 702 as discussed herein where a next frame of the video sequence may be loaded and processed as described. Alternatively, if the video sequence has ended, process 700 may end.

If a region of local interest is detected at decision operation 708, process 700 may continue at operation 709, "Provide Indicator of Local Change", where an indicator of local change may be provided to other modules of a device or the like and process 700 may end at end operation 710. As discussed, such an indicator of local change or local change indicator or the like may include any suitable data or signal and may be used for any suitable purpose such as to awake from a sleep or idle state, illuminate a display device, increase a frame capture rate, increase a frame capture resolution, perform object recognition or tracking, or the like.

As discussed, process 700 may be used to provide local change detection in video. Process 700 may be repeated any number of times for different image frames, video sequences, portions thereof, or the like. Furthermore, process 700 may be performed in serial for keypoints of the current frame, in parallel, or partially in parallel. In some examples, process 700 may be initiated when a device enters a low power state mode or an always on computer vision mode or the like.

Figure 8:
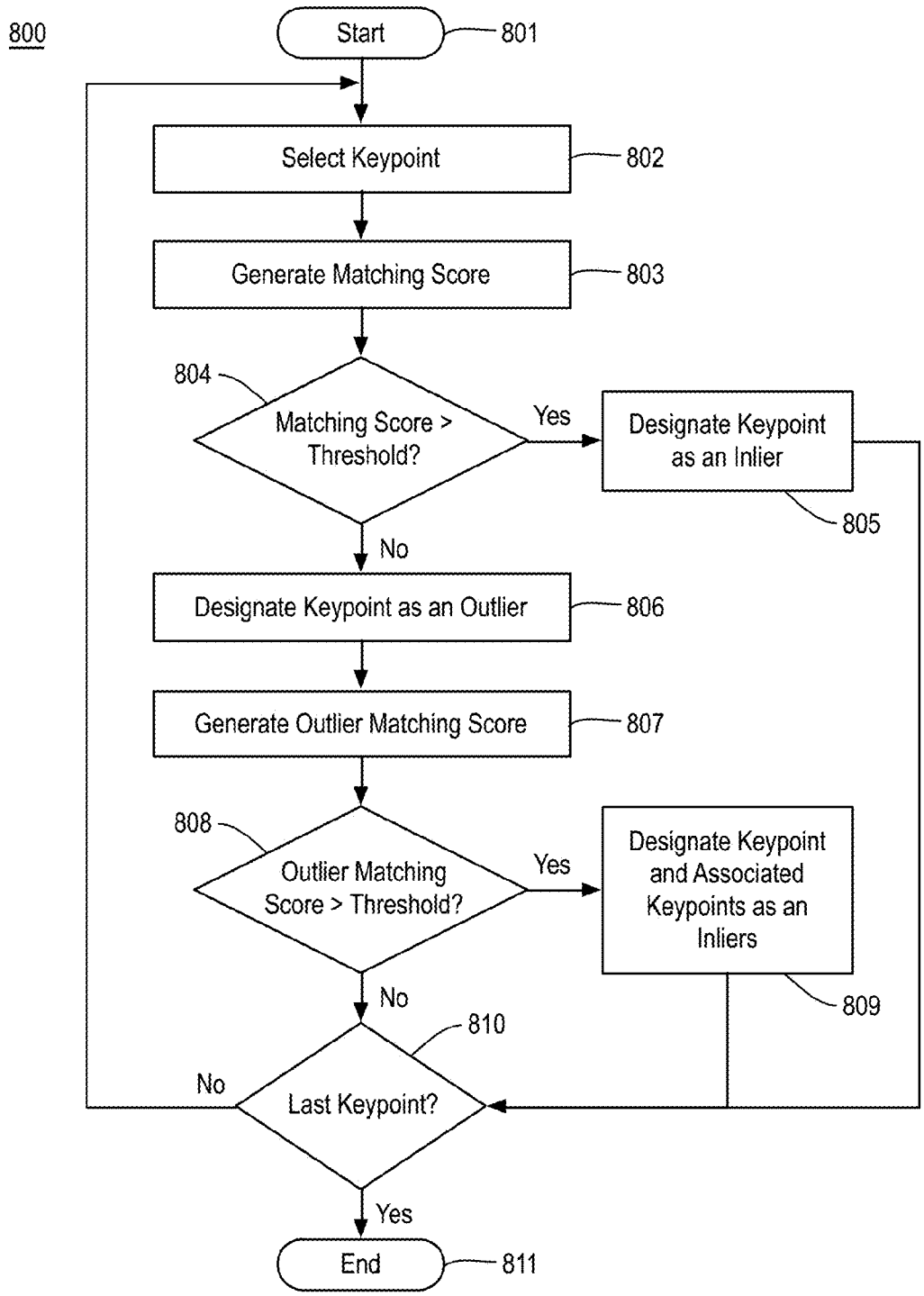
FIG. 8 is a flow diagram illustrating an example process for determining inlier and outlier keypoints for a current frame.

FIG. 8 is a flow diagram illustrating an example process 800 for determining inlier and outlier keypoints for a current frame, arranged in accordance with at least some implementations of the present disclosure. Process 800 may include one or more operations 801-811 as illustrated in FIG. 8. Process 800 may be performed by a device (e.g., device 100 or any other devices or systems discussed herein) or portions of process 800 may be performed by a device to determine inlier and outlier keypoints for a current frame. Process 800 or portions thereof may be repeated for any number keypoints, image frames, video sequences, portions thereof, or the like. In some examples, process 800 or a portion thereof may be performed at operation 706 of process 700.

As shown, process 800 may begin from start operation 801 at operation 802, "Select Keypoint", where a keypoint such as a keypoint of a current frame may be selected. For example, process 800 may be performed for each keypoint of a current frame to categorize such keypoints and inlier keypoints or outlier keypoints.

Processing may continue at operation 803, "Generate Matching Score", where a matching score may be generated for the selected keypoint. The matching score may be generated using any suitable technique or techniques. For example, the selected keypoint and inlier keypoints from previous frames may evaluated to determine matching inlier keypoints, if any, within such previous frames. For example, matching inlier keypoints from previous frames may include those within a spatial proximity (e.g., spatial neighborhood) of the selected keypoint (e.g., after warping to a coordinate system of the current frame) and having a descriptor value within a threshold of the descriptor value of the selected keypoint. For example, a previous frame inlier keypoint having a minimum descriptor value distance may be determined from among previous frame inlier keypoints within a spatial neighborhood of the selected current frame keypoint. If the minimum descriptor value distance (e.g., the difference between the descriptor values of the selected current frame keypoint and the previous frame inlier keypoint having the minimum descriptor value distance) is less than a threshold, a match may be declared and, if not, no match may be declared. Such a process may be repeated for each previous frame used for processing to determine matches for the selected keypoint from inlier keypoints of the previous frames, if any.

Based on such matches (e.g., none, one, or more such matches across previous frames), a matching score may be generated. For example, the matching score may be a sum across the participating previous frames of products of either 1 for a match or 0 for no match and an importance weight. As discussed, the importance weight may weigh matches in more recent past frames more highly than matches to more distance past frames. In some examples, the matching score may be determined as shown with respect to Equation (1).

Processing may continue at decision operation 804, "Matching Score>Threshold?", where a determination may be made as to whether to designate the selected keypoint as an inlier keypoint or an outlier keypoint based on the matching score. For example, the matching score may be compared to a threshold to determine whether to designate the selected keypoint as an inlier keypoint or an outlier keypoint. As shown, in some examples, a determination may be made as to whether the matching score is greater than a threshold. Such a threshold may be characterized as a matching score threshold and may have any suitable value.

As shown, in some examples, if the matching score is greater than the threshold, processing may continue at operation 805, "Designate Keypoint as an Inlier", where the selected keypoint may be designated as an inlier keypoint. For example, the selected keypoint may be designated as an inlier keypoint via inlier/outlier data 128 and an inlier trajectory may be generated and stored (e.g., via inlier trajectory history 110). As shown, processing may continue, for a selected keypoint labeled as an inlier keypoint, at decision operation 810 as is discussed further herein.

If the matching score is not greater than the threshold, processing may continue at operation 806, "Designate Keypoint as an Outlier", where the selected keypoint may be designated as an outlier keypoint. For example, the selected keypoint may be designated as an outlier keypoint via inlier/outlier data 128. As discussed, such outlier keypoints may be subjected to continued processing such as outlier pruning to determine whether they should be relabeled as inlier keypoints. Such outlier keypoints may be characterized as initial outlier keypoints, intermediate outlier keypoints, or the like. For example, such outlier pruning may be performed to remove unstable outliers from subsequent clustering operations. For example, some outliers labeled at operation 806 may be unstable or labeled as outliers for a reason unrelated to local motion or the like. Such outlier pruning may relabel such unstable outliers as well as look back at previous frames to relabel unstable outliers form previous frames (e.g., as discussed with respect to operation 809, all outlier keypoint matches, from the current frame and previous frames, may be relabeled or recategorized as inlier keypoints).

Processing may continue at operation 807, "Generate Outlier Matching Score", where an outlier matching score may be generated for a selected keypoint labeled as an outlier keypoint at operation 806. The outlier matching score may be generated using any suitable technique or techniques. For example, the current outlier keypoint and outlier keypoints from previous frames may be evaluated to determine matches with outlier keypoints, if any, within such previous frames. Such matches or chains of matches may be based on spatial proximity and/or descriptor value proximity as discussed herein. Based on such matches or a chain of such matches (e.g., across the previous frames), an outlier matching score may be generated. For example, the outlier matching score may be a sum across the participating previous frames of products of either 1 for a match or 0 for no match and an importance weight. As discussed, the importance weight may weigh matches in more recent past frames more highly than matches to more distance past frames. For example, the outlier matching score may be determined as shown with respect to Equation (2).

Processing may continue at decision operation 808, "Outlier Matching Score>Threshold?", where a determination may be made as to whether to designate the selected keypoint previously labeled as an outlier keypoint and the chain of outline keypoint matches from previous frames as inlier keypoints based on the outlier matching score. For example, the outlier matching score may be compared to a threshold to determine whether to designate the matching outlier keypoints as inlier keypoints or to leave them as outlier keypoints. As shown, in some examples, a determination may be made as to whether the outlier matching score is greater than a threshold. Such a threshold may be characterized as an outlier matching score threshold and may have any suitable value.

As shown, in some examples, if the outlier matching score is greater than the threshold, processing may continue at operation 805,809, "Designate Keypoint and Associated Keypoints as an Inliers", where the selected keypoint previously labeled as an outlier keypoint and the chain of matching outlier keypoints from previous frames may be designated (e.g., redesignated) as inlier keypoints. For example, such previously designated outlier keypoints may be designated as inlier keypoints via removal from inlier/outlier data 128 to generate final inlier/outlier data 130, and an inlier trajectory may be generated and stored (e.g., via inlier trajectory history 110) for the chain of keypoints.

If the outlier matching score is not greater than the threshold, processing may continue at decision operation 810, "Last Keypoint?". Alternatively, processing may continue from operation 809 at decision operation 810 as discussed. At decision operation 810, a determination may be made as to whether the selected or current keypoint (e.g., the keypoint selected at operation 802) is the last keypoint for the current frame. If not, processing may continue at operation 802, where a next or subsequent keypoint may be selected for processing as discussed. If so, processing may continue at end operation 811. As discussed, in some examples, process 800 may be performed to implement operation 706 of process 700 (please refer to FIG. 7). In such implementations, processing may continue from decision operation 810 to operation 707 of process 700 when the last keypoint of the current frame has been processed.

As discussed, process 800 may be used to determine inlier and outlier keypoints for a current frame. Process 800 may be repeated any number of times for different keypoints, image frames, video sequences, portions thereof, or the like. Furthermore, process 800 may be performed in serial for keypoints of the current frame, in parallel, or partially in parallel. Furthermore, in some examples, only portions of process 800 may be performed. For example, in some implementations, process 800 may include only operations 802-806 and no subsequent outlier pruning may be performed.

Figure 9:
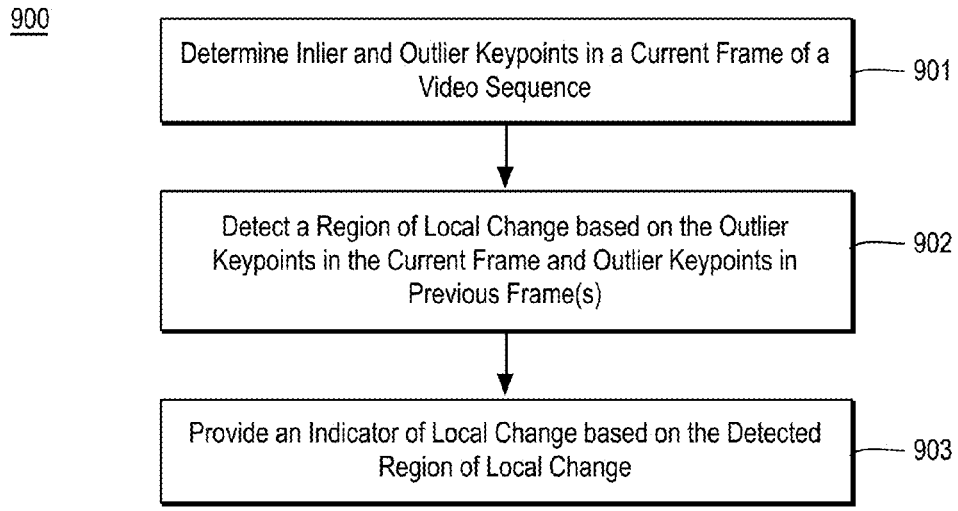
FIG. 9 is a flow diagram illustrating an example process for providing local change detection in video.

FIG. 9 is a flow diagram illustrating an example process for providing local change detection in video, arranged in accordance with at least some implementations of the present disclosure. Process 900 may include one or more operations 901-903 as illustrated in FIG. 9. Process 900 may form at least part of a local change detection process. By way of non-limiting example, process 900 may form at least part of a local change detection process performed by device 100 as discussed herein. Furthermore, process 900 will be described herein with reference to system 1000 of FIG. 10.

Figure 10:
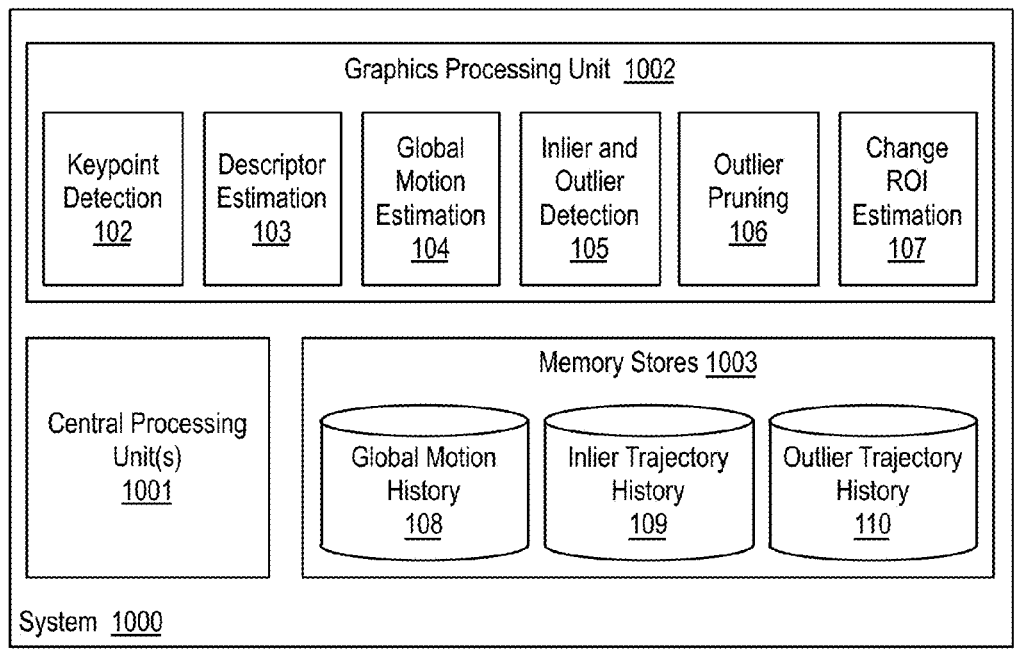
FIG. 10 is an illustrative diagram of an example system for providing local change detection in video.

FIG. 10 is an illustrative diagram of an example system 1000 for providing local change detection in video, arranged in accordance with at least some implementations of the present disclosure. As shown in FIG. 10, system 1000 may include one or more central processing units (CPU) 1001, a graphics processing unit 1002, and memory stores 1003. Also as shown, graphics processing unit 1002 may include keypoint detection module 102, descriptor estimation module 103, global motion estimation module 104, inlier and outlier detection module 105, outlier pruning module 106, and change region of interest estimation module 107. Such modules may be implemented to perform operations as discussed herein. Also as shown, memory stores 1003 may include global motion history 108, inlier trajectory history 109, and outlier trajectory history 110. In the example of system 1000, memory stores 1003 may store video sequence data, video frames, video frame data, keypoint data, keypoint locations, descriptor data, global motion estimates or global motion estimation data, motion data, inlier/outlier keypoint data, final inlier/outlier keypoint data, local change indicators, inlier trajectories, outlier trajectories, mapping data, spatial neighborhood data, importance weights, matching scores, outlier matching scores, bounding box data, cluster data, or the like.

As shown, in some examples, keypoint detection module 102, descriptor estimation module 103, global motion estimation module 104, inlier and outlier detection module 105, outlier pruning module 106, and change region of interest estimation module 107 may be implemented via graphics processing unit 1002. In other examples, one or more or portions of keypoint detection module 102, descriptor estimation module 103, global motion estimation module 104, inlier and outlier detection module 105, outlier pruning module 106, and change region of interest estimation module 107 may be implemented via central processing units 1001 or an image processing unit (not shown) of system 1000. In yet other examples, one or more or portions of keypoint detection module 102, descriptor estimation module 103, global motion estimation module 104, inlier and outlier detection module 105, outlier pruning module 106, and change region of interest estimation module 107 may be implemented via an imaging processing pipeline, graphics pipeline, or the like.

Graphics processing unit 1002 may include any number and type of graphics processing units, that may provide the operations as discussed herein. Such operations may be implemented via software or hardware or a combination thereof. For example, graphics processing unit 1002 may include circuitry dedicated to manipulate image data, CNN data, strong classifier, or the like obtained from memory stores 1003. Central processing units 1001 may include any number and type of processing units or modules that may provide control and other high level functions for system 1000 and/or provide any operations as discussed herein. Memory stores 1003 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1003 may be implemented by cache memory.

In an embodiment, one or more or portions of keypoint detection module 102, descriptor estimation module 103, global motion estimation module 104, inlier and outlier detection module 105, outlier pruning module 106, and change region of interest estimation module 107 may be implemented via an execution unit (EU) of graphics processing unit 1002. The EU may include, for example, programmable logic or circuitry such as a logic core or cores that may provide a wide array of programmable logic functions. In an embodiment, one or more or portions of keypoint detection module 102, descriptor estimation module 103, global motion estimation module 104, inlier and outlier detection module 105, outlier pruning module 106, and change region of interest estimation module 107 may be implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or more or portions of keypoint detection module 102, descriptor estimation module 103, global motion estimation module 104, inlier and outlier detection module 105, outlier pruning module 106, and change region of interest estimation module 107 may be implemented via an application specific integrated circuit (ASIC). The ASIC may include an integrated circuitry customized to perform the operations discussed herein.

Returning to discussion of FIG. 9, process 900 may begin at operation 901, "Determine Inlier and Outlier Keypoints in a Current Frame of a Video Sequence", where one or more inlier keypoints and one or more outlier keypoints may be determined in a current frame of a video sequence based on inlier keypoints in previous frames of the video sequence. For example, matching scores for detected keypoints of the current frame may be compared to a matching threshold to determine whether the keypoints are inlier or outlier keypoints. In some examples, determining the inlier keypoints may include detecting a matching keypoint or several matching keypoints among the inlier keypoints in the previous frames. For example, the matching keypoint may be within a spatial neighborhood of a keypoint of the current frame and may have a smallest descriptor distance with respect to the keypoint of any other inlier keypoints from the previous frame within the spatial neighborhood (e.g., and the smallest descriptor distance may be less than a threshold). In some examples, determining the inlier and outlier keypoints of the current frame may include determining, for the current frame, a plurality of keypoints and associated local image descriptors, warping the inlier keypoints from previous frames to coordinates associated with the current frame, determining, for a keypoint, a matching score based on one or more matches, and comparing the matching score to a threshold to categorize the first keypoint as an inlier keypoint or an outlier keypoint. Furthermore, when the keypoint is categorized as an outlier keypoint, an outlier matching score may be determined for the keypoint based on one or more outlier matches between the keypoint and one or more outlier matching keypoints from previous frames and the keypoint and matching keypoints may be categorized (e.g., recategorized) as an inlier keypoints based a comparison of the outlier matching score to a second threshold.

For example, keypoint detection module 102 as implemented via graphics processing unit 1002 may generate keypoints for a current frame of a video sequence, descriptor estimation module 103 as implemented via graphics processing unit 1002 may generate descriptor(s) for each keypoint, global motion estimation module 104 as implemented via graphics processing unit 1002 may generate global motion estimates for the current frame, inlier and outlier detection module 105 as implemented via graphics processing unit 1002 may determine inlier keypoints and outlier keypoints among the keypoints, and outlier pruning module 106 may relabel matched outlier keypoints as inlier keypoints in some instances.

Processing may continue at operation 902, "Detect a Region of Local Change based on the Outlier Keypoints in the Current Frame and Outlier Keypoints in Previous Frame(s)", where a region of local change may be detected in the video sequence based on the outlier keypoints in the current frame and outlier keypoints in the one or more previous frames of the video sequence. For example, the region of local change may be detected by warping the outlier keypoints in the one or more previous frames to a coordinate system of the current frame and applying a clustering technique to the outlier keypoints of the current frame and the outlier keypoints in the one or more previous frames such that the region of local change is associated with a cluster of at least some of the outlier keypoints. In some examples, outlier keypoints of previous frames may be associated with weighting values based on the previous frame associated with the outlier keypoint such that more distant previous frames have smaller weighting values. For example, change region of interest estimation module 107 as implemented via graphics processing unit 1002 may determine the region of local change based on applying a clustering technique or the like.

Processing may continue at operation 903, "Provide an Indicator of Local Change based on the Detected Region of Local Change", where an indicator of local change may be provided based on the detected region of local change in the video sequence. For example, the indicator of local change may include a local motion detected indicator or signal, bounding box location and size data (e.g., associated with a bounding box bounding the detected region of local change), or the like. For example, change region of interest estimation module 107 as implemented via graphics processing unit 1002 may provide the indicator of local change.

Process 900 may provide for local change detection based on input video frames. Process 900 may be repeated any number of times either in series or in parallel for any number of input video frames, video sequences, or the like. As discussed process 900 may provide for local change detection with high quality and a low implementation footprint (e.g., memory, computational resources, and power consumption).

Various components of the systems described herein may be implemented in software, firmware, and/or hardware and/or any combination thereof. For example, various components of device 100, system 1000, system 1100, or device 1200 may be provided, at least in part, by hardware of a computing System-on-a-Chip (SoC) such as may be found in a computing system such as, for example, a computer, a laptop computer, a tablet, or a smart phone. For example, such components or modules may be implemented via a multi-core SoC processor. Those skilled in the art may recognize that systems described herein may include additional components that have not been depicted in the corresponding figures.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of device 100, system 1000, system 1100, or device 1200, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 11:
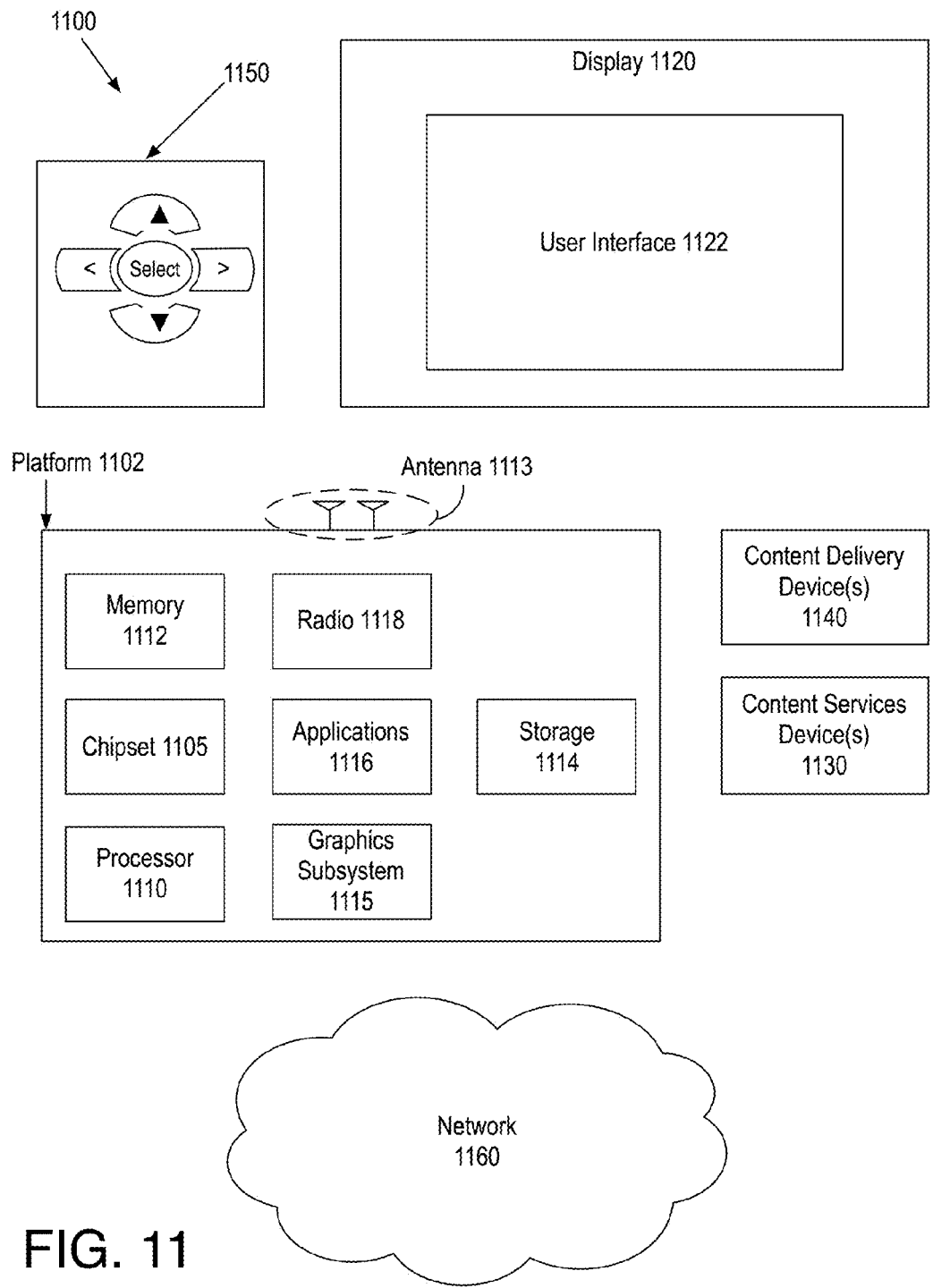
FIG. 11 is an illustrative diagram of an example system.

FIG. 11 is an illustrative diagram of an example system 1100, arranged in accordance with at least some implementations of the present disclosure. In various implementations, system 1100 may be a computing system although system 1100 is not limited to this context. For example, system 1100 may be incorporated into a personal computer (PC), laptop computer, ultra-laptop computer, tablet, phablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, peripheral device, gaming console, wearable device, display device, all-in-one device, two-in-one device, and so forth.

In various implementations, system 1100 includes a platform 1102 coupled to a display 1120. Platform 1102 may receive content from a content device such as content services device(s) 1130 or content delivery device(s) 1140 or other similar content sources such as a camera or camera module or the like. A navigation controller 1150 including one or more navigation features may be used to interact with, for example, platform 1102 and/or display 1120. Each of these components is described in greater detail below.

In various implementations, platform 1102 may include any combination of a chipset 1105, processor 1110, memory 1112, antenna 1113, storage 1114, graphics subsystem 1115, applications 1116 and/or radio 1118. Chipset 1105 may provide intercommunication among processor 1110, memory 1112, storage 1114, graphics subsystem 1115, applications 1116 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Graphics subsystem 1115 may perform processing of images such as still images, graphics, or video for display. Graphics subsystem 1115 may be a graphics processing unit (GPU), a visual processing unit (VPU), or an image processing unit, for example. In some examples, graphics subsystem 1115 may perform scanned image rendering as discussed herein. An analog or digital interface may be used to communicatively couple graphics subsystem 1115 and display 1120. For example, the interface may be any of a High-Definition Multimedia Interface, DisplayPort, wireless HDMI, and/or wireless HD compliant techniques. Graphics subsystem 1115 may be integrated into processor 1110 or chipset 1105. In some implementations, graphics subsystem 1115 may be a stand-alone device communicatively coupled to chipset 1105.

The image processing techniques described herein may be implemented in various hardware architectures. For example, image processing functionality may be integrated within a chipset. Alternatively, a discrete graphics and/or image processor and/or application specific integrated circuit may be used. As still another implementation, the image processing may be provided by a general purpose processor, including a multi-core processor. In further embodiments, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1118 may operate in accordance with one or more applicable standards in any version.

In various implementations, display 1120 may include any flat panel monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

In various implementations, content services device(s) 1130 may include a cable television box, personal computer, network, telephone, Internet enabled devices or appliance capable of delivering digital information and/or content, and any other similar device capable of uni-directionally or bi-directionally communicating content between content providers and platform 1102 and/display 1120, via network 1160 or directly. It will be appreciated that the content may be communicated uni-directionally and/or bi-directionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of navigation controller 1150 may be used to interact with user interface 1122, for example. In various embodiments, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1150 may be replicated on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122, for example. In various embodiments, navigation controller 1150 may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off" In addition, chipset 1105 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various embodiments, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various embodiments, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Figure 12:
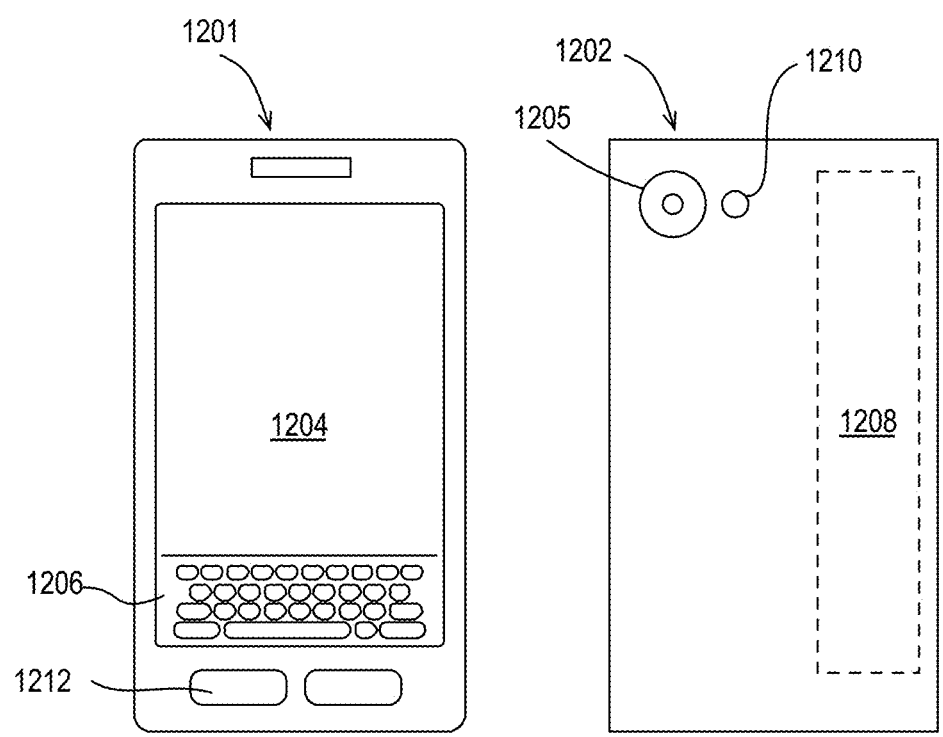
FIG. 12 illustrates an example small form factor device, all arranged in accordance with at least some implementations of the present disclosure.

As described above, system 1100 may be embodied in varying physical styles or form factors. FIG. 12 illustrates an example small form factor device 1200, arranged in accordance with at least some implementations of the present disclosure. In some examples, system 1100 may be implemented via device 1200. In other examples, device 100, system 1000, system 1100, or device 1200, or portions thereof may be implemented via device 1200. In various embodiments, for example, device 1200 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 12, device 1200 may include a housing with a front 1201 and a back 1202. Device 1200 includes a display 1204, an input/output (I/O) device 1206, and an integrated antenna 1208. Device 1200 also may include navigation features 1212. I/O device 1206 may include any suitable I/O device for entering information into a mobile computing device. Examples for I/O device 1206 may include an alphanumeric keyboard, a numeric keypad, a touch pad, input keys, buttons, switches, microphones, speakers, voice recognition device and software, and so forth. Information also may be entered into device 1200 by way of microphone (not shown), or may be digitized by a voice recognition device. As shown, device 1200 may include a camera 1205 (e.g., including a lens, an aperture, and an imaging sensor) and a flash 1210 integrated into back 1202 (or elsewhere) of device 1200. In other examples, camera 1205 and flash 1210 may be integrated into front 1201 of device 1200 or both front and back cameras may be provided. Camera 1205 and flash 1210 may be components of a camera module to originate image data processed into streaming video that is output to display 1204 and/or communicated remotely from device 1200 via antenna 1208 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for providing local change detection in video comprises determining one or more inlier keypoints and one or more outlier keypoints in a current frame of a video sequence based on one or more second inlier keypoints in one or more previous frames of the video sequence, detecting a region of local change in the video sequence based on the outlier keypoints in the current frame and one or more second outlier keypoints in the one or more previous frames of the video sequence, and providing an indicator of local change based on the detected region of local change in the video sequence.

Further to the first embodiments, determining the one or more inlier keypoints and the one or more outlier keypoints comprises, for keypoints of the current frame, comparing matching scores for the keypoints to a matching threshold.

Further to the first embodiments, determining the one or more inlier keypoints comprises, for a first inlier keypoint of the one or more inlier keypoints, detecting a matching keypoint from the one or more second inlier keypoints.

Further to the first embodiments, determining the one or more inlier keypoints comprises, for a first inlier keypoint of the one or more inlier keypoints, detecting a matching keypoint from the one or more second inlier keypoints, wherein the matching keypoint is within a spatial neighborhood of the first inlier keypoint and has a smallest descriptor distance with respect to the first inlier keypoint of any of the one or more second inlier keypoints within the spatial neighborhood.

Further to the first embodiments, detecting the region of local change comprises warping the one or more second outlier keypoints to a coordinate system of the current frame and applying a clustering technique to the outlier keypoints and the one or more second outlier keypoints, wherein the region of local change is associated with a cluster of at least some of the outlier keypoints and the one or more second outlier keypoints.

Further to the first embodiments, detecting the region of local change comprises warping the one or more second outlier keypoints to a coordinate system of the current frame and applying a clustering technique to the outlier keypoints and the one or more second outlier keypoints, wherein the region of local change is associated with a cluster of at least some of the outlier keypoints and the one or more second outlier keypoints, wherein the one or more previous frames comprise multiple previous frames, and wherein an individual outlier keypoint of the one or more second outlier keypoints is associated with a weighting value based on a previous frame of the multiple previous frames associated with the individual outlier keypoint.

Further to the first embodiments, the video sequence comprises low resolution video frames at a frame rate of not more than five frames per second.

Further to the first embodiments, the indicator of local change comprises at least one of a local motion detected indicator or bounding box location and size data.

Further to the first embodiments, the method further comprises estimating global motion associated with the current frame based on correspondences between the one or more inlier keypoints and the one or more second inlier keypoints.

Further to the first embodiments, determining the one or more inlier keypoints and the one or more outlier keypoints in the current frame comprises determining, for the current frame, a plurality of keypoints and associated local image descriptors, warping the one or more second inlier keypoints to coordinates associated with the current frame, determining, for a first keypoint of the plurality of keypoints, a matching score based on one or more matches between the first keypoint and one or more matching keypoints of the plurality of second inlier keypoints, wherein the one or more matching keypoints are from different frames of the one or more previous frames, and comparing the matching score to a threshold to categorize the first keypoint as an inlier keypoint or an outlier keypoint.

Further to the first embodiments, determining the one or more inlier keypoints and the one or more outlier keypoints in the current frame comprises determining, for the current frame, a plurality of keypoints and associated local image descriptors, warping the one or more second inlier keypoints to coordinates associated with the current frame, determining, for a first keypoint of the plurality of keypoints, a matching score based on one or more matches between the first keypoint and one or more matching keypoints of the plurality of second inlier keypoints, wherein the one or more matching keypoints are from different frames of the one or more previous frames, and comparing the matching score to a threshold to categorize the first keypoint as an inlier keypoint or an outlier keypoint, wherein the first keypoint is categorized as an outlier keypoint and the method further comprises determining, for the first keypoint, an outlier matching score based on one or more outlier matches between the first keypoint and one or more outlier matching keypoints of the plurality of second outlier keypoints and categorizing the first keypoint and the one or more outlier matching keypoints as inlier keypoints based on a comparison of the outlier matching score to a second threshold.

Further to the first embodiments, the method further comprises performing a wake up from a low power state based on the indicator of local change.

In one or more second embodiments, a system for providing local change detection in video comprises a memory configured to receive a video sequence and a graphics processing unit coupled to the memory, the graphics processing unit to determine one or more inlier keypoints and one or more outlier keypoints in a current frame of the video sequence based on one or more second inlier keypoints in one or more previous frames of the video sequence, detect a region of local change in the video sequence based on the outlier keypoints in the current frame and one or more second outlier keypoints in the one or more previous frames of the video sequence, and provide an indicator of local change based on the detected region of local change in the video sequence.

Further to the second embodiments, the graphics processing unit to determine the one or more inlier keypoints and the one or more outlier keypoints comprises, for keypoints of the current frame, the graphics processing unit to compare matching scores for the keypoints to a matching threshold.

Further to the second embodiments, the graphics processing unit to determine the one or more inlier keypoints comprises, for a first inlier keypoint of the one or more inlier keypoints, the graphics processing unit to detect a matching keypoint from the one or more second inlier keypoints.

Further to the second embodiments, the graphics processing unit to determine the one or more inlier keypoints comprises, for a first inlier keypoint of the one or more inlier keypoints, the graphics processing unit to detect a matching keypoint from the one or more second inlier keypoints, wherein the matching keypoint is within a spatial neighborhood of the first inlier keypoint and has a smallest descriptor distance with respect to the first inlier keypoint of any of the one or more second inlier keypoints within the spatial neighborhood.

Further to the second embodiments, the graphics processing unit to detect the region of local change comprises the graphics processing unit to warp the one or more second outlier keypoints to a coordinate system of the current frame and apply a clustering technique to the outlier keypoints and the one or more second outlier keypoints, wherein the region of local change is associated with a cluster of at least some of the outlier keypoints and the one or more second outlier keypoints.

Further to the second embodiments, the video sequence comprises low resolution video frames at a frame rate of not more than five frames per second.

Further to the second embodiments, the indicator of local change comprises at least one of a local motion detected indicator or bounding box location and size data.

Further to the second embodiments, the graphics processing unit is further to estimate global motion associated with the current frame based on correspondences between the one or more inlier keypoints and the one or more second inlier keypoints.

Further to the second embodiments, the graphics processing unit to determine one or more inlier keypoints and one or more outlier keypoints in the current frame comprises the graphics processing unit to determine, for the current frame, a plurality of keypoints and associated local image descriptors, warp the one or more second inlier keypoints to coordinates associated with the current frame, determine, for a first keypoint of the plurality of keypoints, a matching score based on one or more matches between the first keypoint and one or more matching keypoints of the plurality of second inlier keypoints, wherein the one or more matching keypoints are from different frames of the one or more previous frames, and comparing the matching score to a threshold to categorize the first keypoint as an inlier keypoint or an outlier keypoint.

Further to the second embodiments, the graphics processing unit to determine one or more inlier keypoints and one or more outlier keypoints in the current frame comprises the graphics processing unit to determine, for the current frame, a plurality of keypoints and associated local image descriptors, warp the one or more second inlier keypoints to coordinates associated with the current frame, determine, for a first keypoint of the plurality of keypoints, a matching score based on one or more matches between the first keypoint and one or more matching keypoints of the plurality of second inlier keypoints, wherein the one or more matching keypoints are from different frames of the one or more previous frames, and comparing the matching score to a threshold to categorize the first keypoint as an inlier keypoint or an outlier keypoint, wherein the first keypoint is categorized as an outlier keypoint, and wherein the graphics processing unit is further to determine, for the first keypoint, an outlier matching score based on one or more outlier matches between the first keypoint and one or more outlier matching keypoints of the plurality of second outlier keypoints and to categorize the first keypoint and the one or more outlier matching keypoints as inlier keypoints based on a comparison of the outlier matching score to a second threshold.

Further to the second embodiments, the system further comprises a power management unit to perform a wake up from a low power state based on the indicator of local change.

Further to the second embodiments, the system further comprises an image sensor to attain raw image data associated with a scene and an image processing unit couple do the image sensor and to provide a frame of the video sequence to the memory based on the raw image data.

In one or more third embodiments, a system for providing local change detection in video comprises means for determining one or more inlier keypoints and one or more outlier keypoints in a current frame of a video sequence based on one or more second inlier keypoints in one or more previous frames of the video sequence, means for detecting a region of local change in the video sequence based on the outlier keypoints in the current frame and one or more second outlier keypoints in the one or more previous frames of the video sequence, and means for providing an indicator of local change based on the detected region of local change in the video sequence.

Further to the third embodiments, the means for determining the one or more inlier keypoints and the one or more outlier keypoints comprise means for comparing, for keypoints of the current frame, matching scores for the keypoints to a matching threshold.

Further to the third embodiments, the means for determining the one or more inlier keypoints comprise means for detecting, for a first inlier keypoint of the one or more inlier keypoints, a matching keypoint from the one or more second inlier keypoints.

Further to the third embodiments, the means for determining the one or more inlier keypoints comprise means for detecting, for a first inlier keypoint of the one or more inlier keypoints, a matching keypoint from the one or more second inlier keypoints, wherein the matching keypoint is within a spatial neighborhood of the first inlier keypoint and has a smallest descriptor distance with respect to the first inlier keypoint of any of the one or more second inlier keypoints within the spatial neighborhood.

Further to the third embodiments, the means for detecting the region of local change comprise means for warping the one or more second outlier keypoints to a coordinate system of the current frame and means for applying a clustering technique to the outlier keypoints and the one or more second outlier keypoints, wherein the region of local change is associated with a cluster of at least some of the outlier keypoints and the one or more second outlier keypoints.

Further to the third embodiments, the means for detecting the region of local change comprise means for warping the one or more second outlier keypoints to a coordinate system of the current frame and means for applying a clustering technique to the outlier keypoints and the one or more second outlier keypoints, wherein the region of local change is associated with a cluster of at least some of the outlier keypoints and the one or more second outlier keypoints, wherein the one or more previous frames comprise multiple previous frames, and wherein an individual outlier keypoint of the one or more second outlier keypoints is associated with a weighting value based on a previous frame of the multiple previous frames associated with the individual outlier keypoint.

Further to the third embodiments, the video sequence comprises low resolution video frames at a frame rate of not more than five frames per second.

Further to the third embodiments, the indicator of local change comprises at least one of a local motion detected indicator or bounding box location and size data.

Further to the third embodiments, the system further comprises means for estimating global motion associated with the current frame based on correspondences between the one or more inlier keypoints and the one or more second inlier keypoints.

Further to the third embodiments, the means for determining the one or more inlier keypoints and the one or more outlier keypoints in the current frame comprise means for determining, for the current frame, a plurality of keypoints and associated local image descriptors, means for warping the one or more second inlier keypoints to coordinates associated with the current frame, means for determining, for a first keypoint of the plurality of keypoints, a matching score based on one or more matches between the first keypoint and one or more matching keypoints of the plurality of second inlier keypoints, wherein the one or more matching keypoints are from different frames of the one or more previous frames, and means for comparing the matching score to a threshold to categorize the first keypoint as an inlier keypoint or an outlier keypoint.

Further to the third embodiments, the means for determining the one or more inlier keypoints and the one or more outlier keypoints in the current frame comprise means for determining, for the current frame, a plurality of keypoints and associated local image descriptors, means for warping the one or more second inlier keypoints to coordinates associated with the current frame, means for determining, for a first keypoint of the plurality of keypoints, a matching score based on one or more matches between the first keypoint and one or more matching keypoints of the plurality of second inlier keypoints, wherein the one or more matching keypoints are from different frames of the one or more previous frames, and means for comparing the matching score to a threshold to categorize the first keypoint as an inlier keypoint or an outlier keypoint, wherein the first keypoint is categorized as an outlier keypoint and the system further comprises means for determining, for the first keypoint, an outlier matching score based on one or more outlier matches between the first keypoint and one or more outlier matching keypoints of the plurality of second outlier keypoints and means for categorizing the first keypoint and the one or more outlier matching keypoints as inlier keypoints based on a comparison of the outlier matching score to a second threshold.

Further to the third embodiments, the system further comprises means for performing a wake up from a low power state based on the indicator of local change.

In one or more fourth embodiments, at least one machine readable medium comprises a plurality of instructions that, in response to being executed on a device, cause the device to provide local change detection by determining one or more inlier keypoints and one or more outlier keypoints in a current frame of a video sequence based on one or more second inlier keypoints in one or more previous frames of the video sequence, detecting a region of local change in the video sequence based on the outlier keypoints in the current frame and one or more second outlier keypoints in the one or more previous frames of the video sequence, and providing an indicator of local change based on the detected region of local change in the video sequence.

Further to the fourth embodiments, determining the one or more inlier keypoints and the one or more outlier keypoints comprises, for keypoints of the current frame, comparing matching scores for the keypoints to a matching threshold.

Further to the fourth embodiments, determining the one or more inlier keypoints comprises, for a first inlier keypoint of the one or more inlier keypoints, detecting a matching keypoint from the one or more second inlier keypoints.

Further to the fourth embodiments, detecting the region of local change comprises warping the one or more second outlier keypoints to a coordinate system of the current frame and applying a clustering technique to the outlier keypoints and the one or more second outlier keypoints, wherein the region of local change is associated with a cluster of at least some of the outlier keypoints and the one or more second outlier keypoints.

Further to the fourth embodiments, the indicator of local change comprises at least one of a local motion detected indicator or bounding box location and size data.

Further to the fourth embodiments, the machine readable medium comprises further instructions that, in response to being executed on the device, cause the device to provide local change detection by estimating global motion associated with the current frame based on correspondences between the one or more inlier keypoints and the one or more second inlier keypoints.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A device implemented method for providing local change detection in video comprising:
   determining one or more inlier keypoints and one or more outlier keypoints in a current frame of a video sequence based on one or more second inlier keypoints and one or more second outlier keypoints in one or more previous frames of the video sequence;
   warping the one or more second outlier keypoints in the one or more previous frames to a coordinate system of the current frame;
   applying a clustering technique to the outlier keypoints and the warped one or more second outlier keypoints in the coordinate system of the current frame to detect a cluster of the outlier keypoints and the warped one or more second outlier keypoints in the coordinate system of the current frame;
   generating an indicator of local region of interest change corresponding to the cluster and the current frame in response to the detected cluster; and
   initiating a process at the device in response to the local region of interest indicator.

2. The method of claim 1, wherein determining the one or more inlier keypoints and the one or more outlier keypoints comprises, for keypoints of the current frame, comparing matching scores for the keypoints to a matching threshold.

3. The method of claim 1, wherein determining the one or more inlier keypoints comprises, for a first inlier keypoint of the one or more inlier keypoints, detecting a matching keypoint from the one or more second inlier keypoints.

4. The method of claim 3, wherein the matching keypoint is within a spatial neighborhood of the first inlier keypoint and has a smallest descriptor distance with respect to the first inlier keypoint of any of the one or more second inlier keypoints within the spatial neighborhood.

5. The method of claim 1, wherein the clustering technique comprises one of a weighted k-means clustering technique, a connectivity based clustering technique, a centroid based clustering technique, or a distribution based clustering technique.

6. The method of claim 1, wherein the one or more previous frames comprise multiple previous frames, a first individual outlier keypoint of the one or more second outlier keypoints is associated with a first weighting value based on a first previous frame of the multiple previous frames including the first individual outlier keypoint, a second individual outlier keypoint of the one or more second outlier keypoints is associated with a second weighting value based on a second previous frame of the multiple previous frames including the second individual outlier keypoint, and the first weighting value is greater than the second weighting value based on the first previous frame being more recent than the second previous frame.

7. The method of claim 1, wherein the video sequence comprises low resolution video frames at a frame rate of not more than five frames per second.

8. The method of claim 1, wherein the indicator of local region of interest change comprises at least one of a local motion detected indicator or bounding box location and size data.

9. The method of claim 1, further comprising:
   estimating global motion associated with the current frame based on correspondences between the one or more inlier keypoints and the one or more second inlier keypoints.

10. The method of claim 1, wherein determining the one or more inlier keypoints and the one or more outlier keypoints in the current frame comprises:
   determining, for the current frame, a plurality of keypoints and associated local image descriptors;
   determining, for a first keypoint of the plurality of keypoints, a matching score based on one or more matches between the first keypoint and one or more matching keypoints of the plurality of second inlier keypoints, wherein the one or more matching keypoints are from different frames of the one or more previous frames; and comparing the matching score to a threshold to categorize the first keypoint as an inlier keypoint or an outlier keypoint.

11. The method of claim 10, wherein the first keypoint is categorized as an outlier keypoint, the method further comprising:

determining, for the first keypoint, an outlier matching score based on one or more outlier matches between the first keypoint and one or more outlier matching keypoints of the plurality of second outlier keypoints; and categorizing the first keypoint and the one or more outlier matching keypoints as inlier keypoints based on a comparison of the outlier matching score to a second threshold.

12. The method of 1, wherein the process at the device comprises one of performing a wake up from a low power state, illuminating a display of the device, performing object recognition, or performing object tracking.

13. A system for providing local change detection in video comprising:

a memory configured to receive a video sequence; and a processor coupled to the memory, the processor to determine one or more inlier keypoints and one or more outlier keypoints in a current frame of the video sequence based on one or more second inlier keypoints and one or more second outlier keypoints in one or more previous frames of the video sequence, to warp the one or more second outlier keypoints in the one or more previous frames to a coordinate system of the current frame, to apply a clustering technique to the outlier keypoints and the warped one or more second outlier keypoints in the coordinate system of the current frame to detect a cluster of the outlier keypoints and the warped one or more second outlier keypoints in the coordinate system of the current frame, to generate an indicator of local region of interest change corresponding to the cluster and the current frame in response to the detected cluster, and to initiate a process at the device in response to the local region of interest indicator.

14. The system of claim 13, wherein the processor to determine the one or more inlier keypoints and the one or more outlier keypoints comprises, for keypoints of the current frame, the processor to compare matching scores for the keypoints to a matching threshold.

15. The system of claim 13, wherein the processor to determine the one or more inlier keypoints comprises, for a first inlier keypoint of the one or more inlier keypoints, the processor to detect a matching keypoint from the one or more second inlier keypoints.

16. The system of claim 13, wherein the clustering technique comprises one of a weighted k-means clustering technique, a connectivity based clustering technique, a centroid based clustering technique, or a distribution based clustering technique.

17. The system of claim 13, wherein the indicator of local region of interest change comprises at least one of a local motion detected indicator or bounding box location and size data.

18. The system of claim 13, the processor further to estimate global motion associated with the current frame based on correspondences between the one or more inlier keypoints and the one or more second inlier keypoints.

19. The system of claim 13, further comprising:

an image sensor to attain raw image data associated with a scene; and an image processor coupled to the image sensor and to provide a frame of the video sequence to the memory based on the raw image data.

20. At least one non-transitory machine readable medium comprising a plurality of instructions that, in response to being executed on a device, cause the device to provide local change detection by:

determining one or more inlier keypoints and one or more outlier keypoints in a current frame of a video sequence based on one or more second inlier keypoints and one or more second outlier keypoints in one or more previous frames of the video sequence;

warping the one or more second outlier keypoints in the one or more previous frames to a coordinate system of the current frame;

applying a clustering technique to the outlier keypoints and the warped one or more second outlier keypoints in the coordinate system of the current frame to detect a cluster of the outlier keypoints and the warped one or more second outlier keypoints in the coordinate system of the current frame;

generating an indicator of local region of interest change corresponding to the cluster and the current frame in response to the detected cluster; and initiating a process at the device in response to the local region of interest indicator.

21. The machine readable medium of claim 20, wherein determining the one or more inlier keypoints and the one or more outlier keypoints comprises, for keypoints of the current frame, comparing matching scores for the keypoints to a matching threshold.

22. The machine readable medium of claim 20, wherein determining the one or more inlier keypoints comprises, for a first inlier keypoint of the one or more inlier keypoints, detecting a matching keypoint from the one or more second inlier keypoints.

23. The machine readable medium of claim 20, wherein the clustering technique comprises one of a weighted k-means clustering technique, a connectivity based clustering technique, a centroid based clustering technique, or a distribution based clustering technique.

24. The machine readable medium of claim 20, wherein the indicator of local region of interest change comprises at least one of a local motion detected indicator or bounding box location and size data.

25. The machine readable medium of claim 20, the machine readable medium comprising further instructions that, in response to being executed on the device, cause the device to provide local change detection by:

estimating global motion associated with the current frame based on correspondences between the one or more inlier keypoints and the one or more second inlier keypoints.

* * * * *